Oct. 16, 1962  A. G. BUTLER  3,059,096
IN-PROCESS BUTT-WELDING APPARATUS

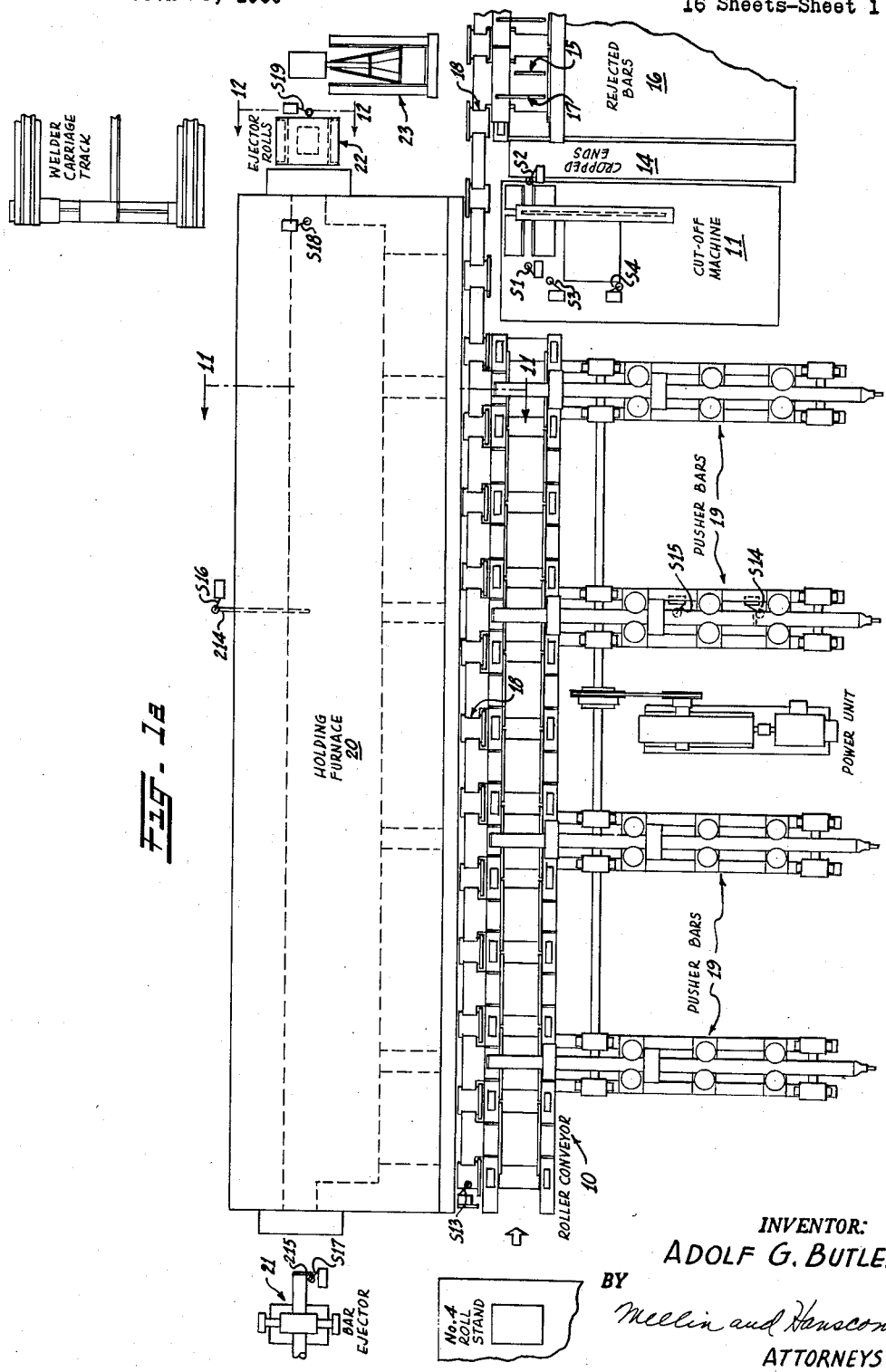

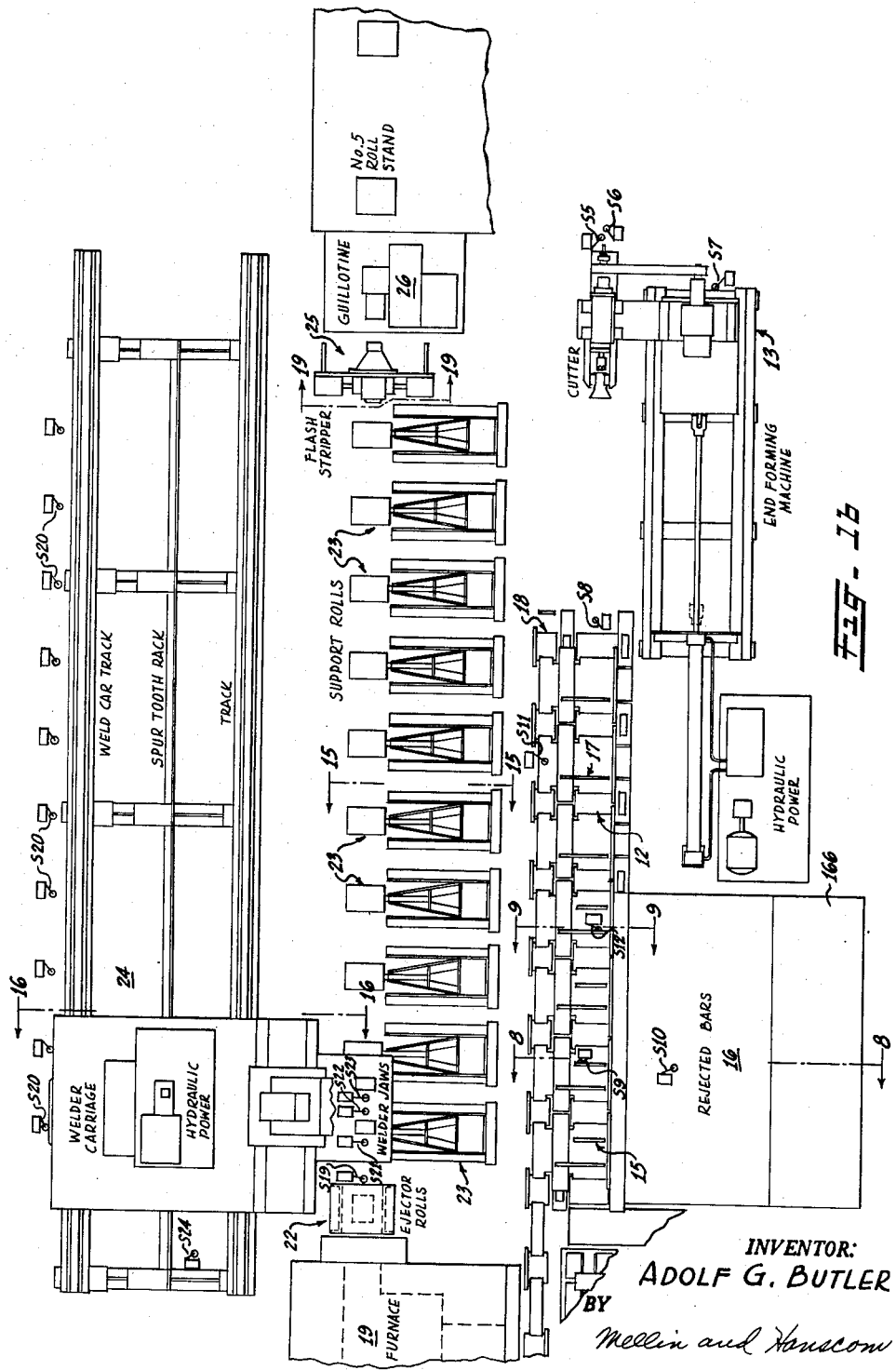

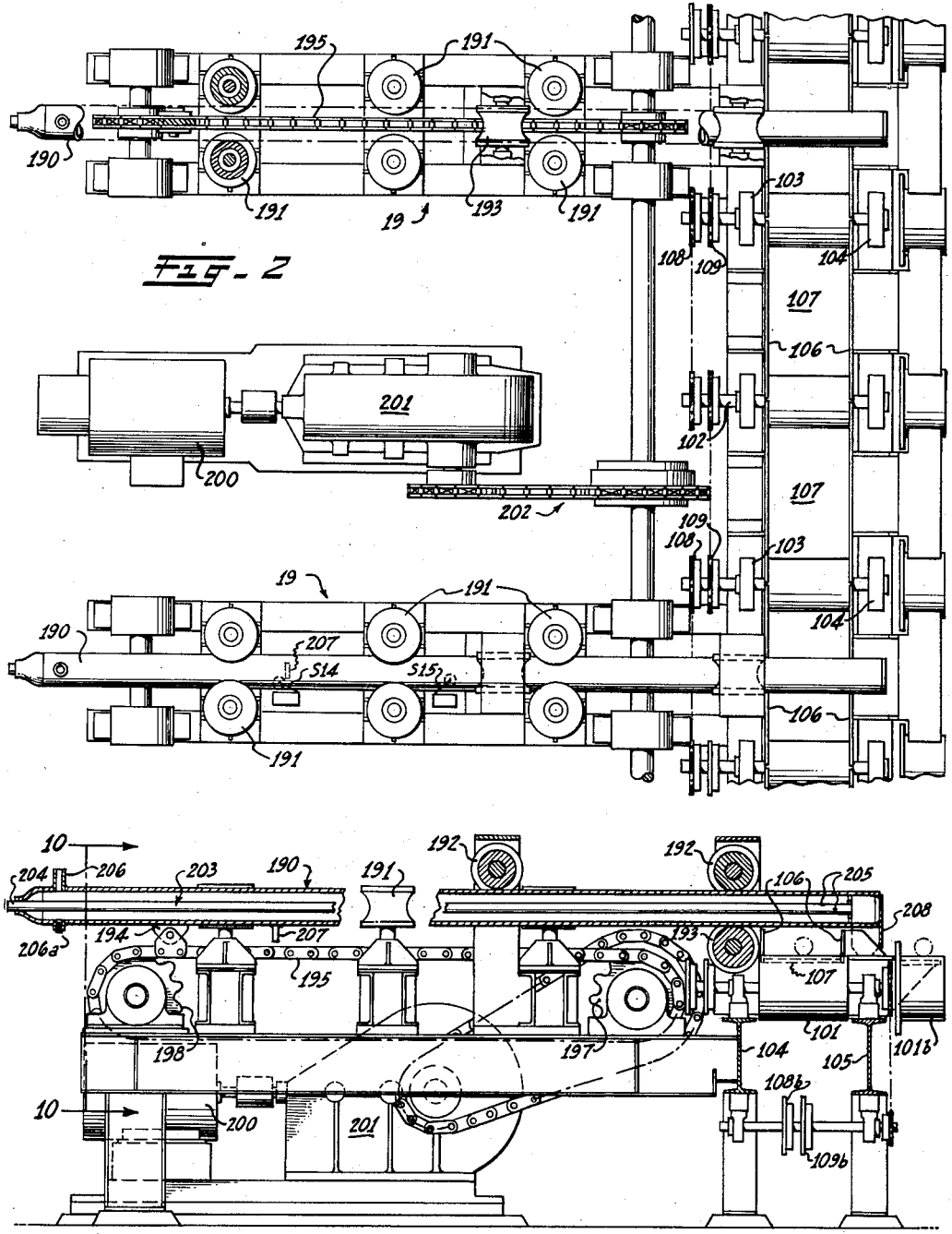

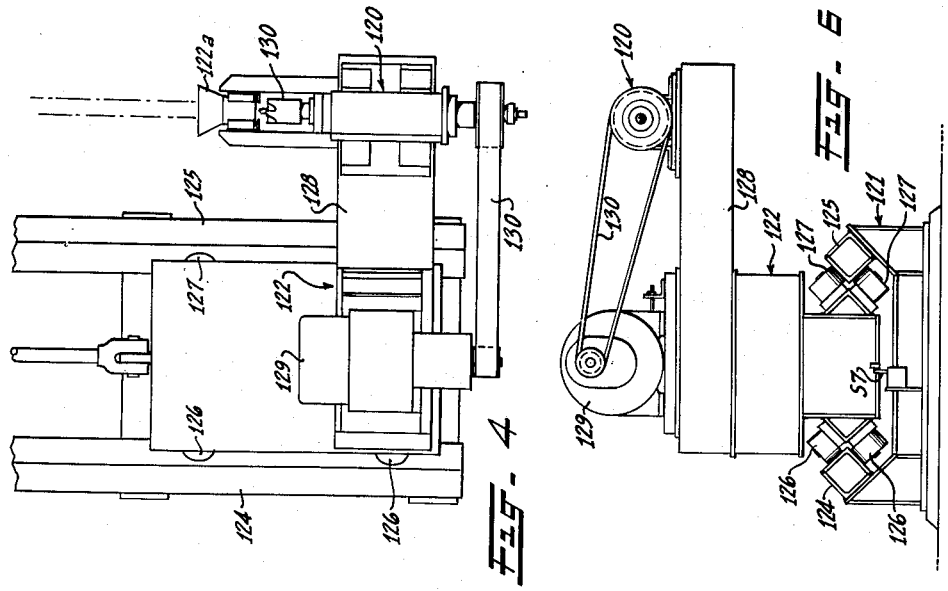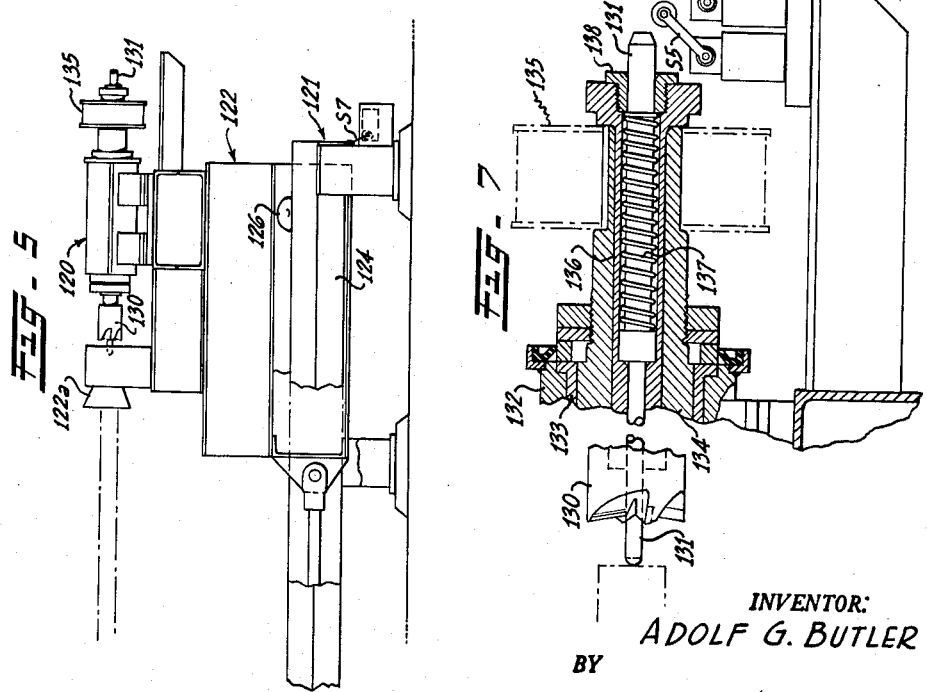

Filed March 28, 1960  16 Sheets-Sheet 5

INVENTOR:
ADOLF G. BUTLER
BY
Mellin and Hanscom
ATTORNEYS

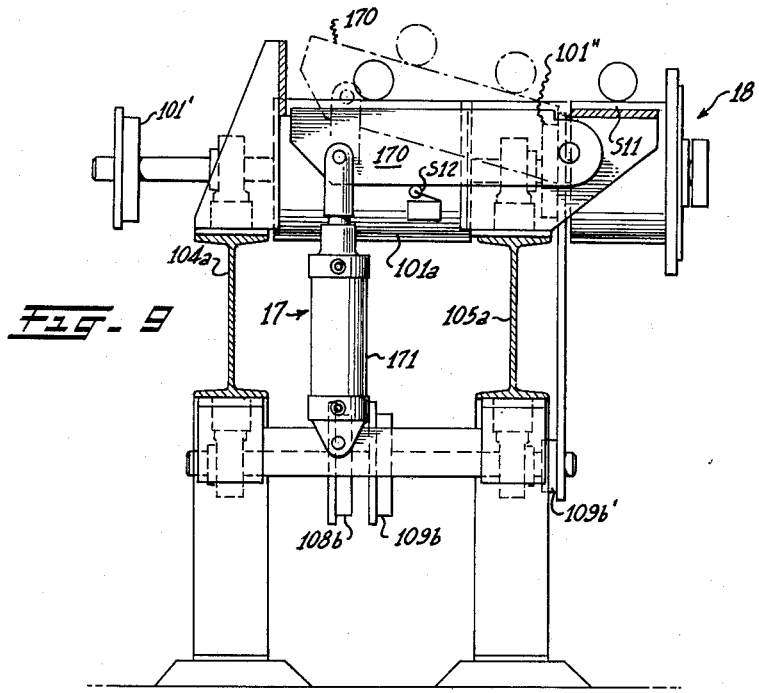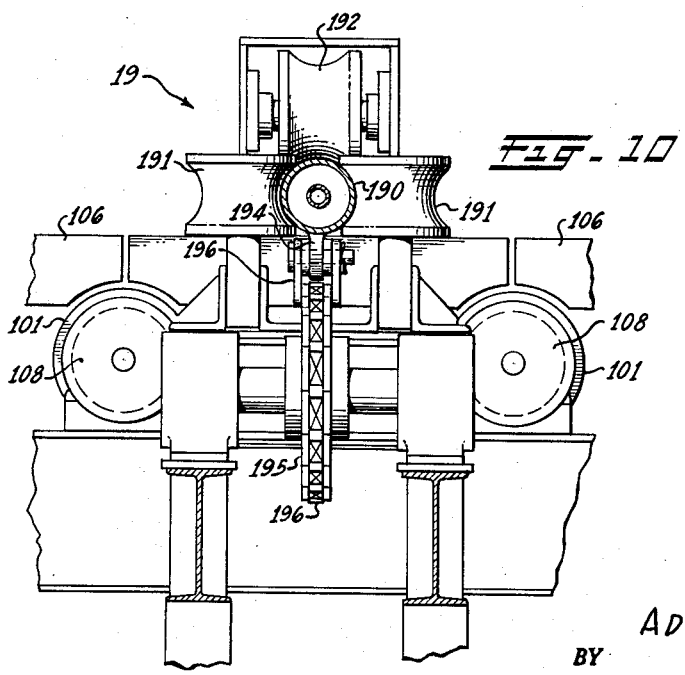
INVENTOR:
ADOLF G. BUTLER
BY
Mellin and Hanscom
ATTORNEYS

Oct. 16, 1962　　A. G. BUTLER　　3,059,096
IN-PROCESS BUTT-WELDING APPARATUS
Filed March 28, 1960　　16 Sheets-Sheet 8
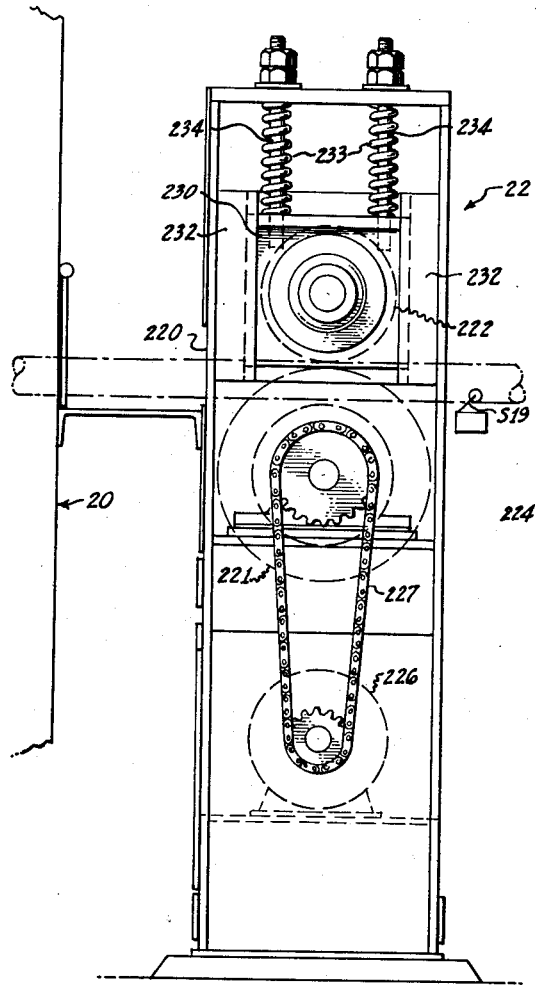
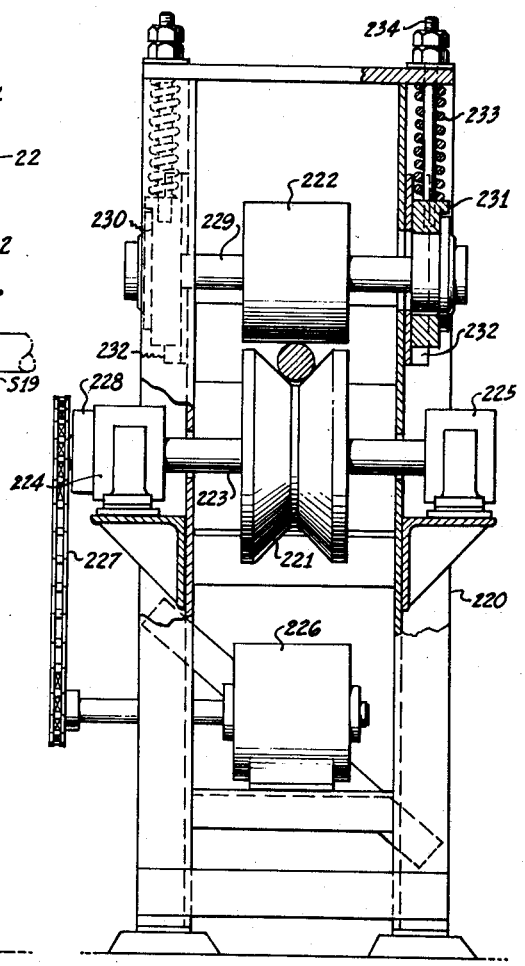
INVENTOR:
ADOLF G. BUTLER
BY
ATTORNEYS Oct. 16, 1962 A. G. BUTLER 3,059,096
IN-PROCESS BUTT-WELDING APPARATUS
Filed March 28, 1960 16 Sheets-Sheet 9

INVENTOR:
ADOLF G. BUTLER
BY
Meelin and Hanscom
ATTORNEYS

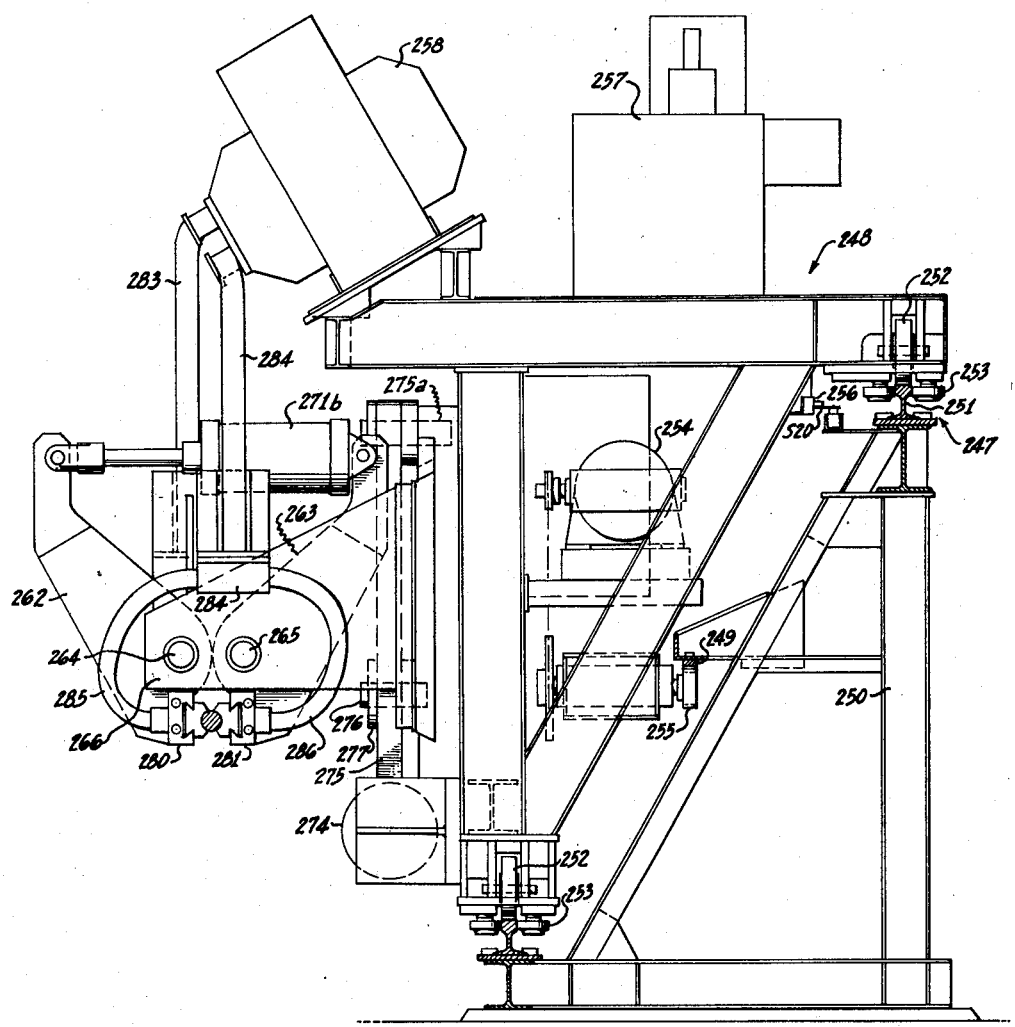

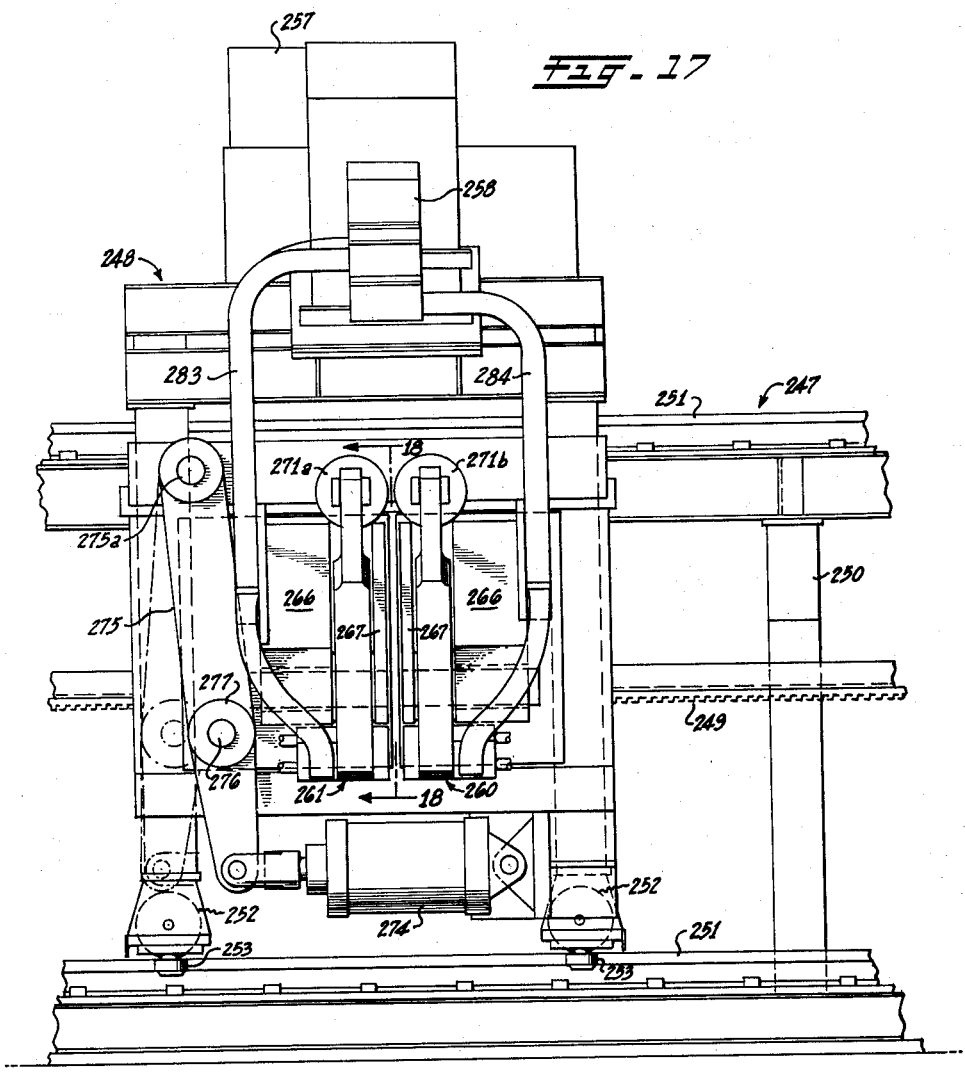

Oct. 16, 1962 A. G. BUTLER 3,059,096
IN-PROCESS BUTT-WELDING APPARATUS
Filed March 28, 1960 16 Sheets-Sheet 12
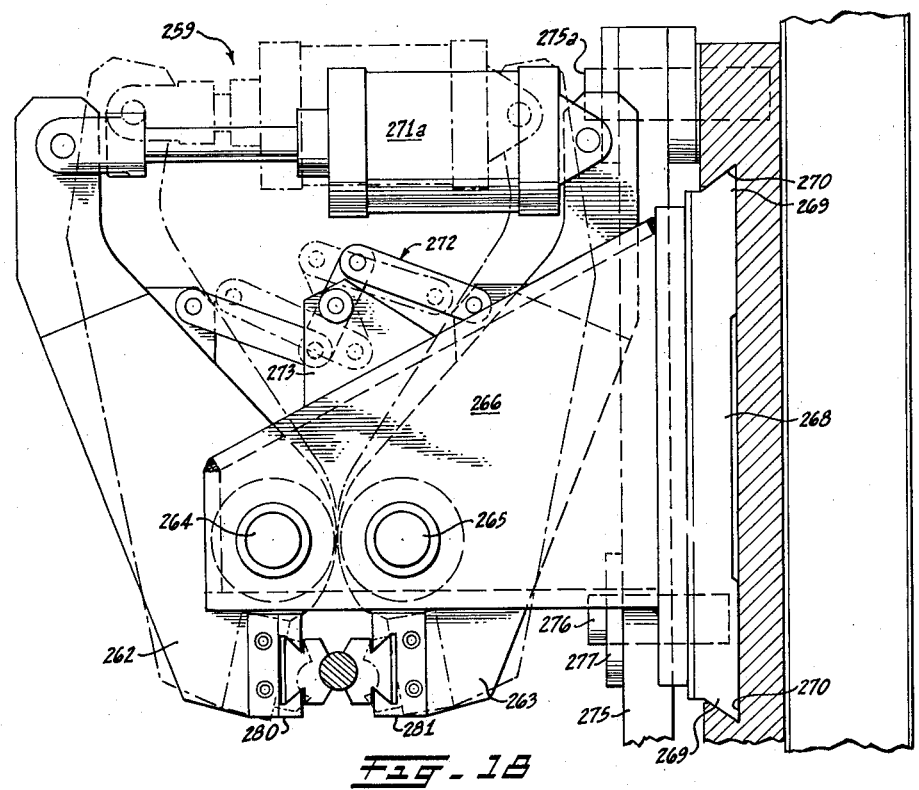
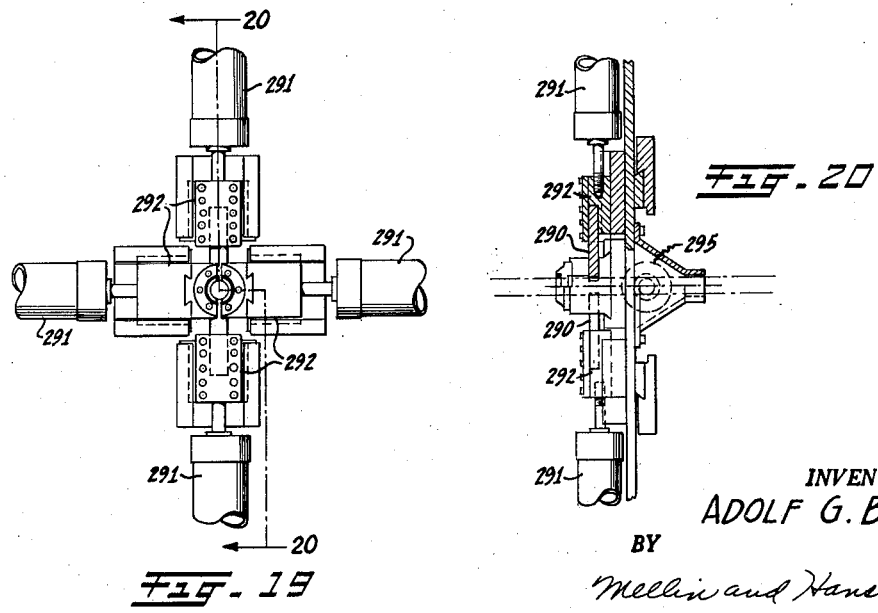
INVENTOR:
ADOLF G. BUTLER
BY
Mellin and Hanscom
ATTORNEYS Oct. 16, 1962     A. G. BUTLER     3,059,096
IN-PROCESS BUTT-WELDING APPARATUS
Filed March 28, 1960     16 Sheets-Sheet 13
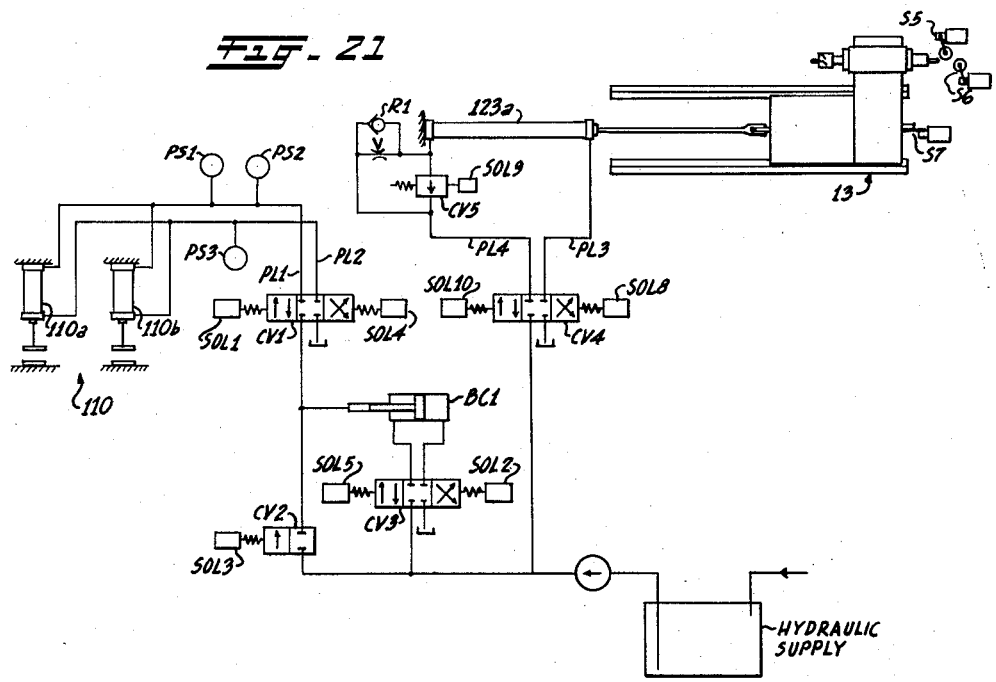
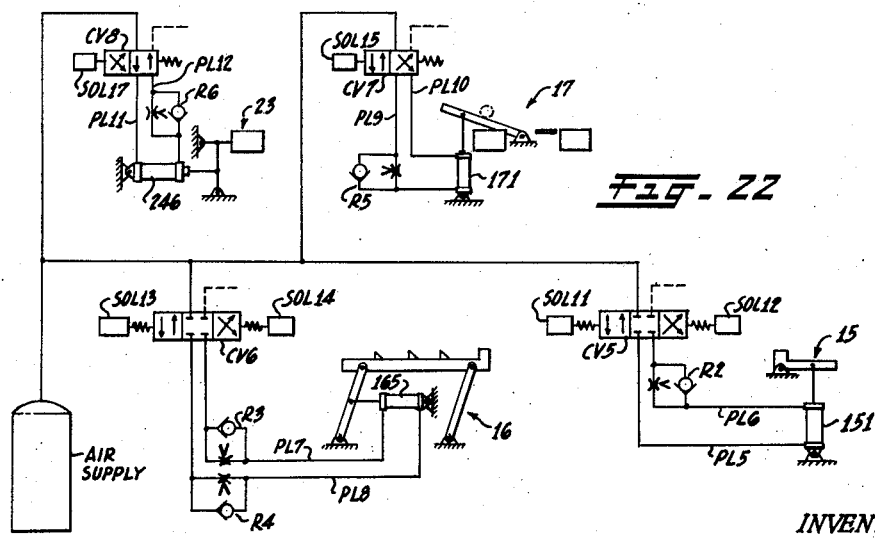
INVENTOR:
ADOLF G. BUTLER
BY
ATTORNEYS

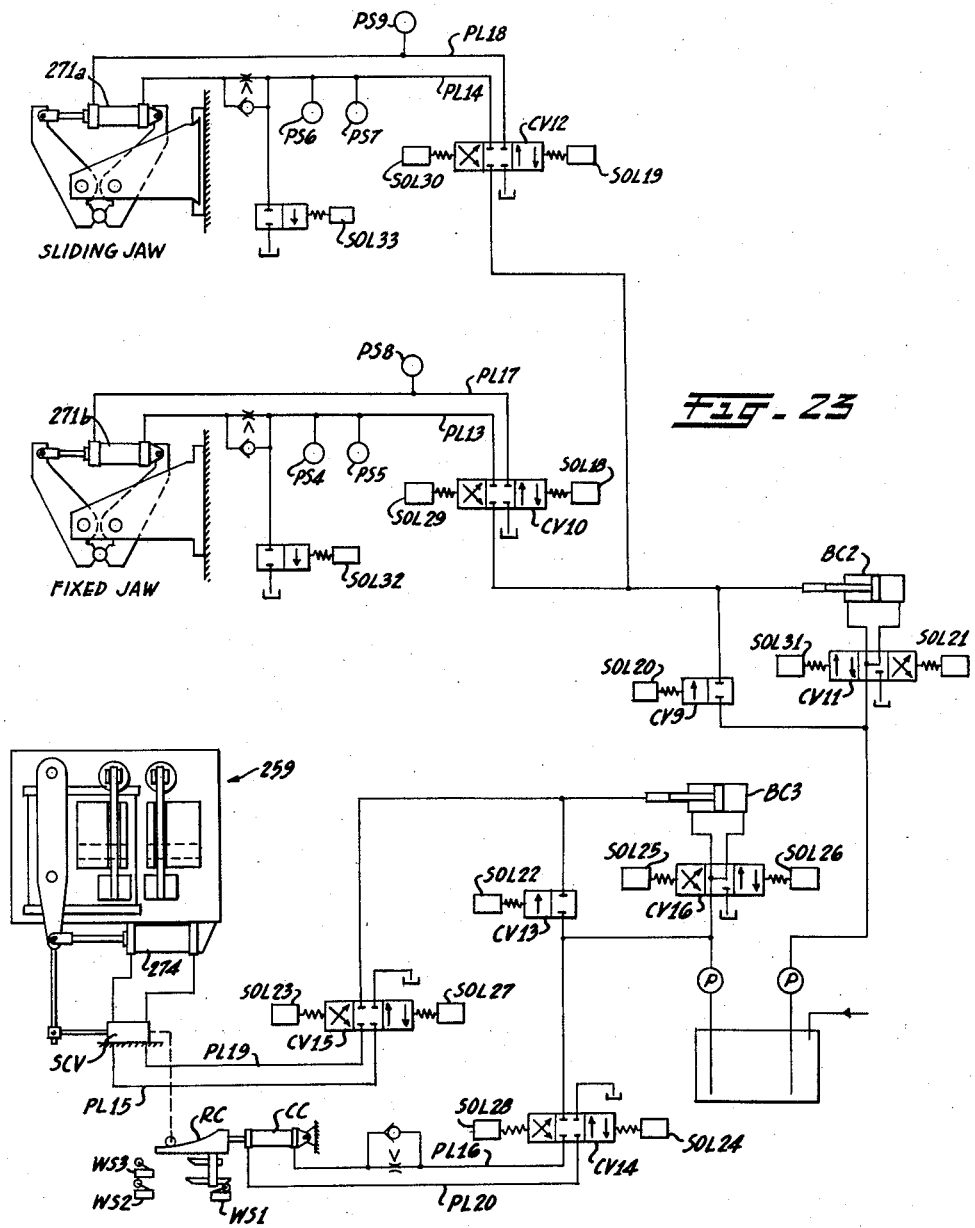

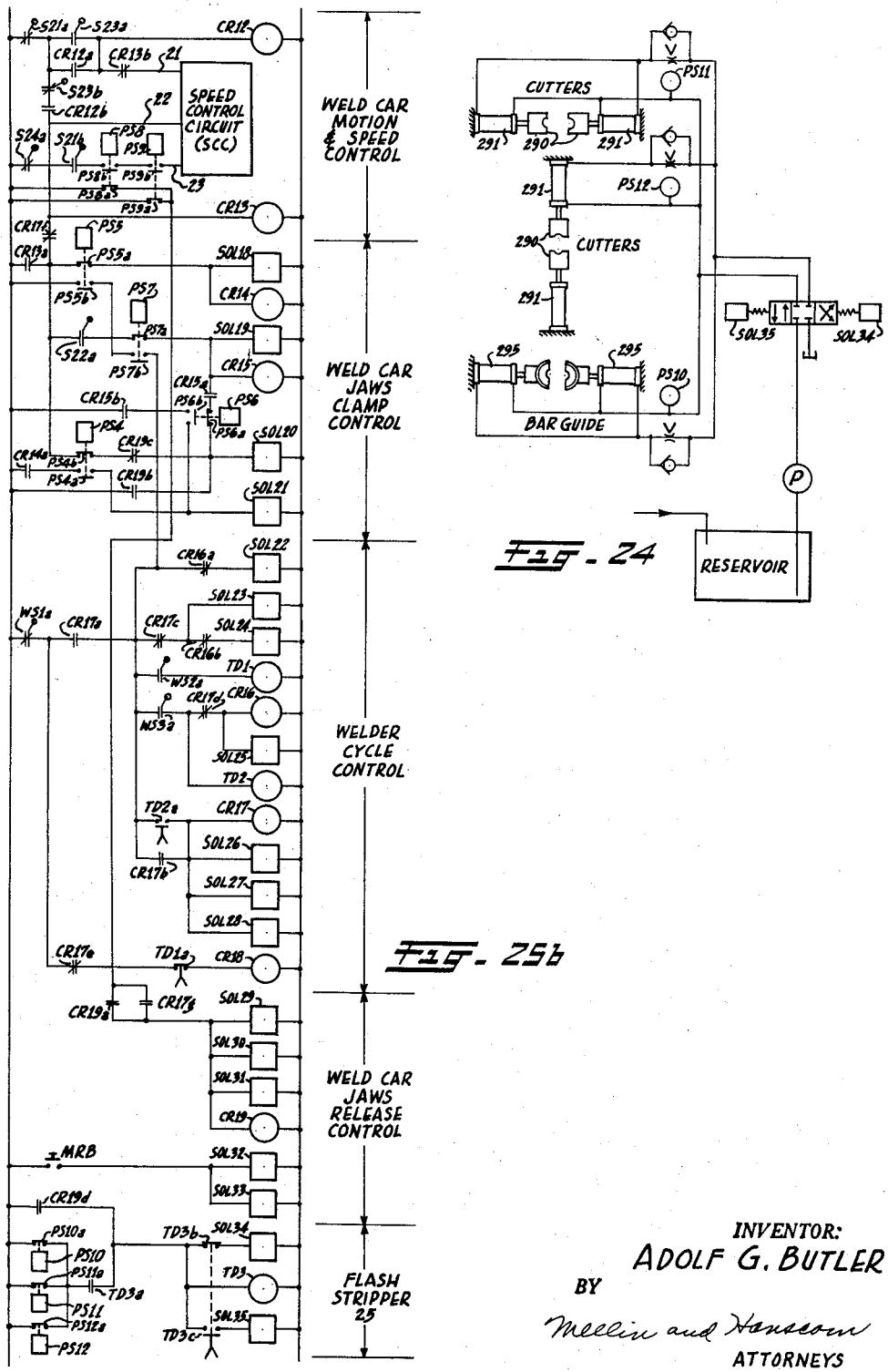

INVENTOR:
ADOLF G. BUTLER
BY
ATTORNEYS

United States Patent Office 3,059,096
Patented Oct. 16, 1962

3,059,096
IN-PROCESS BUTT-WELDING APPARATUS
Adolf G. Butler, Downey, Calif., assignor to American Pipe and Construction Co., South Gate, Calif., a corporation of Delaware
Filed Mar. 28, 1960, Ser. No. 17,827
12 Claims. (Cl. 219—101)

This invention relates to apparatus for butt-welding the ends of bar material while it is being reduction rolled, or processed. More particularly, the invention involves apparatus for cropping the ends of bar material, forming one end of the bar material to a shape suitable for welding, preheating the bar material, and butt-welding the ends of bar material as it is being processed from a furnace. Conveyor means and bar-transfer devices are utilized for passing the bar material between operating stations, and a control circuit is provided for operating each processing apparatus, the conveyor means and bar-transfer devices in an interlocked and repetitive cycle of operation.

It is common practice in continuous rolling mills to place steel ingots into a reheat furnace where they are heated to a desired rolling temperature. The heated ingots are then ejected from the furnace and passed through a series of "roughing" stands which progressively reduce the ingots into an elongated bar of comparatively small diameter. At this point the leading and trailing ends of the bar may be cropped to remove any unsound material, and unsuitable bars may be rejected. The cropped bars are then rolled through a series of "intermediate" and "finishing" stands, thus forming the bars to a desired size and shape.

Straight rods may be produced by passing the hot rolled bars from the last roll stand by means of a conveyor to a "hot bed" where they are allowed to cool, and then cut to desired lengths. The length of these bars is obviously limited by the size of the ingot from which they were formed, but longer bars are obtained by butt-welding the ends of two or more bars together. Inasmuch as the conventional butt-welding procedure is not an integral part of the rolling operation, the formation of longer bars from shorter bars involves separate processing and, as a consequence, the cost of manufacture is very high.

Some of the longer finish-rolled bars are diverted from the last roll stand by means of guides to a coiling mechanism. The size of a coil is generally determined by the mass of the ingot from which the coiled rod is rolled. If longer coils are desired, two or more finished coils may be butt-welded together, but this is also a costly and time-consuming process.

In the rolling operations, where the bars pass from one roll stand to the next, the cross-sections of the bar material are changed in shape and reduced in area. This reduction in cross-sectional area results in an elongation of the bar and a progessive increase in the speed at which the bars pass through the roll stands. Bar speeds ranging upto 35 miles per hour are common. Because of these speeds and the flexibility of the hot material, the leading ends of the bars may fail to enter a roll stand properly. This will produce a tangled mass of steel known as a "cobble" which is dangerous to the personnel and necessitates shutting down the mill, resulting in lost production. And, inasmuch as each piece of bar material formed from an ingot has a leading end that must be introduced to the roll stands, "cobbles" are common occurrences.

Therefore, one primary object of this invention is to provide apparatus for the production of any desired size of coil by butt-welding the bar material "on the fly," thereby producing a continuous flow of rod material and minimizing the number of cobbles by reducing the number of entries into the roll stands.

A second object is to provide apparatus for butt-welding the ends of successively rolled bar material, thereby forming a continuous rod of bar material that may be fed through "intermediate" or "finishing" roll stands as a single rod.

Another object of this invention is to provide apparatus for butt-welding bar material while in transit from a cut-off station to a terminal exit comprising: cut-off means for cropping the ends of bar material, end-forming means for machining the ends of bar material into a suitable shape for being welded, means for butt-welding the tail end of a first bar to the lead end of a second bar, means for moving bar material from said cut-off station to said butt-welding means and toward a terminal exit, and control circuit means for operating each of said above named means in an interlocked and repetitive cycle of operation.

Another object is to provide apparatus for butt-welding the ends of two bars as they are being moved in-process. This apparatus includes a butt-welder mechanism supported upon a carriage that may be moved along a bar-supporting conveyor; and while the bar is being moved upon said conveyor the butt-welder mechanism will engage the tail end of a first bar and the leading end of a second bar, forming a butt-weld therebetween.

A further object of this invention is to provide apparatus for butt-welding the ends of two bars including a weld car mounted upon a track, said car being adapted to be moved along said track at the same rate as the two bars that are to be welded together.

It is another object to provide a butt-welding apparatus including a novel support for pairs of complementary clamping jaws.

Another object is to provide apparatus for cropping and forming the ends of bar material, thereby preparing the material for being butt-welded in a continuous operating cycle.

Another object of this invention is to provide apparatus for cropping and forming the ends of bar material including means for selectively rejecting bars that are unsuitable for being butt-welded.

A further object is to provide apparatus for cropping and forming the ends of bar material including control circuit means for continuously processing bar material from a receiving station through a cut-off machine and an end-forming machine.

It is another object of this invention to provide apparatus for preparing bar material to be butt-welded including an end-forming machine and having control apparatus therefor whereby bar material can be suitably shaped for butt-welding.

Another object is to provide apparatus for preparing bar material to be butt-welded including a furnace means and control apparatus therefor, whereby bar material is continuously passed through said furnace and ejected therefrom in a condition for being butt-welded.

Other objects of this invention will become apparent in view of the drawings and the following detailed description.

In the drawings, forming a part of this application, and in which like parts are designated by like reference numerals throughout the same, FIGS. 1a and 1b are contiguous plan layouts of apparatus for performing an in-process butt-welding operation between roll stands of a mill;

FIG. 2 is an enlarged plan view of certain pusher bars and a portion of a roller conveyor shown in FIG. 1a;

FIG. 3 is a side view of a pusher bar mechanism partially shown in section;

FIG. 4 is an enlarged plan view of the cutter mounting shown in FIG. 1b;

FIG. 5 is a side elevation of the cutter mounting shown in FIG. 4, some parts having been removed;

FIG. 6 is an end elevation of the cutter mounting down in FIG. 4;

FIG. 7 is an enlarged detail of a portion of the cutter shown in FIG. 5, some parts being deleted and others shown in vetrical section;

FIG. 9 is a vertical section taken on lines 9—9 of FIG. 1b and showing means for transferring bar material from one conveyor to another;

FIG. 10 is a vertical section taken on lines 10—10 of FIG. 3, showing means for actuating the pusher bars;

FIG. 12 is a vertical section taken on lines 12—12 of FIG. 1a, showing an end elevation of the ejector rolls;

FIG. 13 is a side elevation of the ejector rolls;

FIG. 16 is an enlarged vertical section taken on lines 16—16 of FIG. 1b, showing the welder carriage and related apparatus in side elevation;

FIG. 17 is a front elevation of the welder carriage and related apparatus;

FIG. 18 is an enlarged side detail of the rear welder bar clamping means as viewed along lines 18—18 on FIG. 17;

FIG. 19 is an enlarged partial section taken on lines 19—19 of FIG. 1b, showing details of the flash stripper;

FIG. 20 is a vertical section taken on lines 20—20 of FIG. 19;

FIG. 21 is a schematic circuit for hydraulic operation of the clamping means at the cut-off station and the end-forming apparatus;

FIG. 22 is a schematic circuit for pneumatically operating the support rolls, the bar rejector mechanism and the bar transfer means;

FIG. 23 is a schematic circuit for hydraulic operation of the welder car bar clamping means;

FIG. 24 is a schematic circuit for hydraulic operation of the flash stripper; and FIGS. 25a and 25b illustrate a control circuit for operating the apparatus shown and incorporating the switch operators disposed as shown in FIGS. 1a and 1b.

Figure 8:
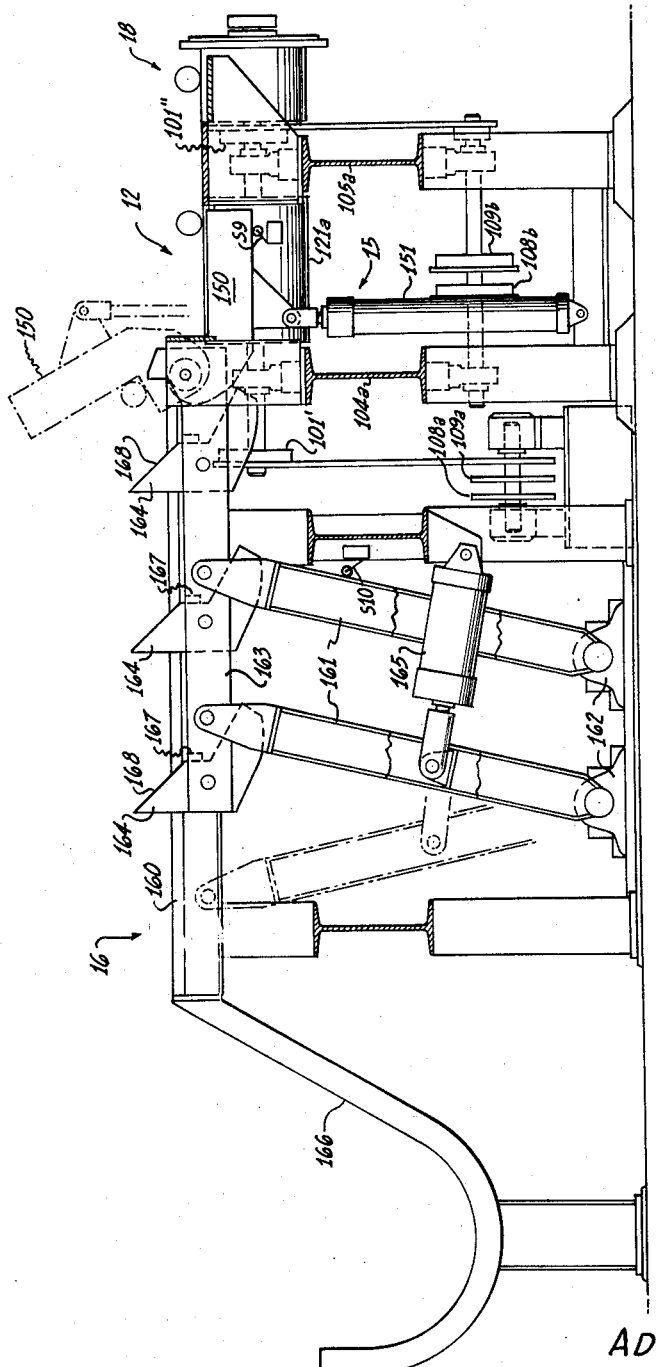
FIG. 8 is a vertical section taken on lines 8—8 of FIG. 1b, particularly showing the means for rejecting bar material.

General Description of the In-Process Butt-Welding Apparatus

Referring more particularly to FIGS. 1a and 1b there is shown a plan layout of apparatus for butt-welding bar material end to end while being processed between roll stands No. 4 and No. 5 of a rolling mill. In a brief description of operation, a first roller conveyor 10 passes bar material from roll stand No. 4 toward a cut-off machine 11, where the leading end of a bar may be cropped. The bar is then carried forward on a second roller conveyor 12 until the trailing end thereof is positioned for cropping, the leading end of the bar then being positioned adjacent the end-forming machine 13. While the trailing end is being cropped, the end-forming machine is moved toward the leading end of the bar, cutting and forming the end to a desirable shape for butt-welding. The cropped ends of the bars are removed from the cut-off station upon a cropped ends conveyor 14 of conventional design; and, should it be observed by an operator that a particular bar is unsuitable for further processing, that bar may be moved by transfer mechanism 15 from conveyor 12 onto a rejected bars conveyor 16. If the bars pass inspection they are moved by other transfer mechanism 17 from conveyor 12 onto a conveyor 18 which passes the bar material toward and in front of a holding furnace 20. Pusher bars 19 are then employed to move the bar material from conveyor 18 into and through furnace 20 and as each bar arrives on the opposite side of said furnace, a bar ejector mechanism 21 pushes that bar from the furnace between power-driven ejector rolls 22. At this stage of processing, the bar material has been prepared for being butt-welded to the trailing end of the preceding processed bar member, such member now being supported upon support rolls 23. An in-process butt-welder 24 engages the tail end of the forward bar member and the leading end of the rear bar member and forms a butt-weld therebetween as both members are being moved upon the support rolls. The butt-weld is completed before the weld portion of the bars arrives at a flash stripper 25 which removed the "flash" from around the weld. In the event that it seems desirable to remove a section of the welded bar material, a guillotine 26 may be installed in the path of bar movement between the weld car and the next roll stand, No. 5, said guillotine cutting through the bar while it is in motion.

The above described apparatus is operated by control mechanism, including a control system for automatically processing bar material between roll stands No. 4 and No. 5. Inasmuch as this control system is intimately related to the manner of operating each machine and conveyor mechanism, a detailed explanation of this circuitry (in conjunction with multiple switch operators) will be described following a detailed description of the various machines and their related apparatus.

Apparatus for Preparing Bar Material To Be Butt-Welded

As the bar material comes out of roll stand No. 4 it is received on roller conveyor 10. Referring to FIGS. 2 and 3, the roller conveyor comprises a plurality of roller members 101, each mounted upon a shaft between horizontally spaced bearings 102 and 103, said bearings being supported upon I-beams 104 and 105. Side guide plates 106 and bottom guide plates 107 are provided between the rollers, said plates also being supported indirectly by I-beams 104 and 105. Roller members 101 are driven by a pulley connection, including pairs of pulley members 108 and 109, both mounted upon shaft 102 and being connected to respectively similar pulley members of adjacent rollers. As shown in FIG. 3, the bar material moves upon the upper surfaces of the rollers and beneath the pusher bars 19. An electric motor (not shown) is operatively connected to the endmost roller member for driving all roller members together and at the same speed.

Figure 25A:
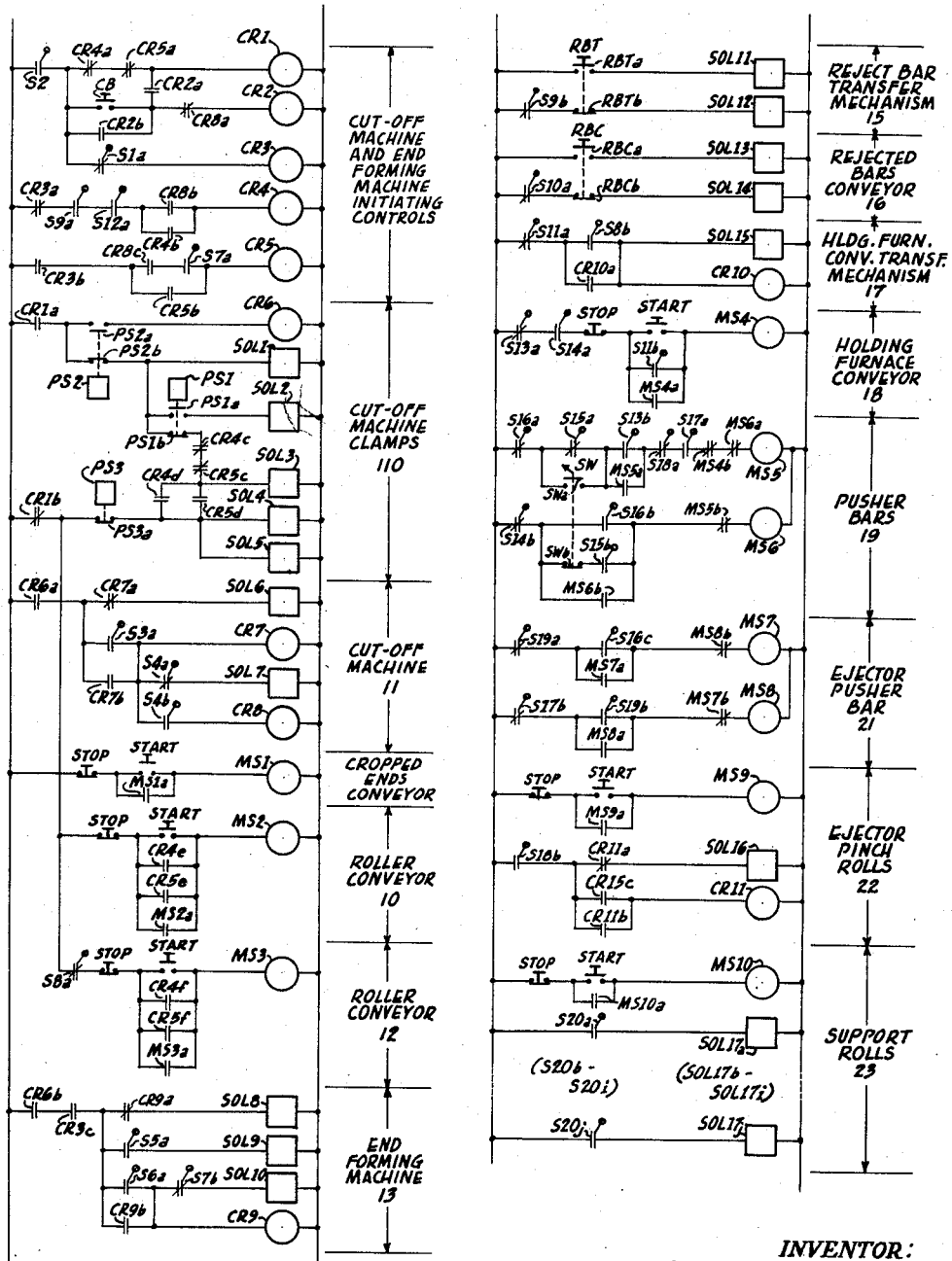

Bar material is passed from the roll stand No. 4 to the cut-off machine 11, which is of a conventional construction having clamping means 110, including double acting cylinders 110a and 110b, for gripping the bar material preparatory to cropping. The machine includes a cutter means mounted upon a reciprocally movable carriage 111 that traverses the path of bar movement, said carriage being operated by a versible motor (not shown). Switch operators S1 and S2 are disposed on opposite sides of the clamping means in the path of bar movement for operating a control circuit in a manner to be described. Other control switch operators S3 and S4 are positioned to be engaged by a carriage member at the extremities of carriage traverse. A control circuit for operating the clamping cylinders is shown in FIGS. 21 and 25a, more particularly described below.

After the leading end of a bar has been cropped, conveyor 10 passes the bar onto conveyor 12 and toward an end-forming station. As the trailing end of the bar approaches the cut-off machine the bar is again clamped and the trailing end is cropped. While the trailing end of the bar is being cropped (and the clamping means 110 is gripping said bar), the end-forming machine 13 is actuated, thereby bringing a cutter head 120 into engagement with the leading end of the bar. The cutter head machines said leading end into a suitable shape for butt-welding, one such shape being a truncated cone. A conveyor 14 receives the cropped ends of the bars as the bars are moved forwardly, said conveyor removing the cropped ends from the cut-off station and allowing successive bars to be advanced through a repeating cycle of cutter operation.

End-forming machine 13 is more particularly illustrated in FIGS. 4–7 and generally comprises a carriage support bed 121, a cutter carriage 122 that is reciprocally mounted upon said bed, and a hollow frustum bar guide 122a which shrouds an end-milling cutter mounted on head 120. An hydraulic power plant 123 (shown in FIG. 1b), including a double acting cylinder 123a, is provided for moving the carriage with its cutter toward the end of bar material while it is being supported upon conveyor 12. A control circuit for operating the end-forming machine is shown in FIGS. 21 and 25a and is described below in connection with the complete butt-welding cycle of operation.

Bed 121 includes a pair of spaced, horizontal support rails 124 and 125 upon which carriage 122 is reciprocally moved. Support wheels 126 and 127 are rotatably mounted on opposite sides of the carriage and engage inclined dihedral surfaces of rails 124 and 125, thereby positioning and supporting the carriage both vertically and laterally. The carriage includes a laterally extending support arm 128 upon which the cutter head 120 is supported in the path of bar movement. A motor 129 is also supported upon arm 128 and is operatively connected to an end-milling cutter 130 rotatably supported in head 120 by means of V-belt drive 130.

Cutter head 120, shown in detail in FIG. 7, provides a sensing rod 131 for detecting the approach of bar material toward the end-milling cutter 130. Head 120 comprises a collar 132 having a bearing sleeve 133 and an inner rotatable sleeve 134 mounted therein. Sleeve 134 extends laterally outward from the bearing collar and is adapted to be fitted with a splined pulley 135. Cutter support shaft 136 extends through sleeve 134 and is rotatably driven therewith. The end-milling cutter is made fast at one end of shaft 136, the other end being recessed for housing a portion of sensing rod 131 and a coiled biasing spring 137. Both the cutter support shaft 136 and its cutter 130 are centrally bored for receiving the end of sensing rod 131 therethrough. A threaded bushing member 138 captivates sensing rod 131 and its biasing means 137 while permitting limited reciprocal movement. When the sensing rod is engaged by the leading end of bar material it is forced backward against the coiled spring 137 until a point is reached where the cutting edges of cutter 130 contact the bar. Shortly before cutter 130 engages the bar, the opposite end of rod 131 actuates a switch operator S5 mounted upon arm 128 of carriage 122. A second switch operator S6 is engaged by the sensing rod after cutter 130 forms the end of the bar material to a predetermined depth, said rod being moved against spring 137 as the cutter is operating. In addition, a limit switch operator S7 is mounted upon bed 121 in the path of carriage movement.

After the trailing end of a bar has been cropped and the leading end formed, the bar is passed forwardly on conveyor 12 toward switch operator S8, which is positioned proximate the end of said conveyor. However, if the bar is not considered suitable, it may be removed from further processing by operation of a transfer mechanism 15 shown in FIG. 8, which removes the bar from conveyor 12, placing said bar on rejected bars conveyor 16.

Transfer mechanism 15 includes a plurality of tiltable transfer arms 150 pivotally mounted from I-beam member 104a, which also partially supports roller members 101a of conveyor 12, said conveyor being supported and driven by an electric motor through pulleys 108a, 109a and 101' in a manner similar to the structure provided for conveyor 10 previously described. One or more pneumatic double-acting cylinders 151 are provided for actuating the transfer arms from a position below the supporting plane of roller members 101a to the position shown by the broken lines in FIG. 8.

The rejected bars conveyor 16 receives bar material upon actuation of the transfer arms 150 to their raised positions, said bar material being deposited on support rails 160 of said conveyor. Rods 161 are pivotally supported upon a base 162 and are interconnected by one or more horizontal connecting members 163, thereby forming a parallel linkage which may be pivoted and yet maintain said connecting members 163 in a horizontal position. Spaced finger members 164 are pendantly supported from members 163 and project above the supporting surface of rails 160. At least one double-acting pneumatic cylinder 165 is provided for actuating the parallel linkage, thereby moving horizontal members 163 and the finger members 164 in a direction away from conveyor 12 and toward a trough 166 for retaining rejected bars.

When rods 161 are actuated toward the broken line position illustrated in FIG. 8, the finger members engage stops 167, which prevent clockwise rotation as shown, and urge the bars confined therebetween toward trough 166. However, when the cylinder 165 is reversely operated (moving rods 161 to the full line positions illustrated) the finger members are contacted by the more recently rejected bars upon the inclined surfaces 168. Since stops 167 only limit clockwise rotation of the finger members, each finger pivots to a position beneath rails 160, thereby passing under the more recently rejected bars, and emerging in back thereof. By repeated operation of the actuating cylinder 165, rejected bar material can be moved from a position adjacent conveyor 12 to the remote position occupied by trough 166.

A switch operator S9 is mounted proximate the transfer mechanism and is adapted to be engaged by a transfer arm 150 when it occupies a position beneath roller 121a. Switch operator S9 is utilized in a control circuit for operating the cylinder 151 and also a control circuit for operating conveyor 12. A second switch operator S10 is mounted near the supporting structure for conveyor 16. Switch operator S10 is engaged by rod 161 while it occupies the full line position shown in FIG. 8.

If the cropped and formed bar material is suitable for being butt-welded to other bar material, it is allowed to move forwardly upon conveyor 12 until it engages operator S8. The bar is then transferred from roller conveyor 12 to roller conveyor 18 by transfer mechanism 17, shown in FIG. 9, comprising a plurality of tiltable transfer arms 170 and one or more pneumatically operated, double-acting cylinders 171. Conveyor 18 is supported in juxtaposed relation to conveyor 12 and at substantially the same height. Accordingly, as the arms 170 are pivoted from beneath rollers 101a of conveyor 12 they are transferred to roller members 101b of conveyor 18, said roller members being driven through pulleys 108b, 109b, 109b' and 101" from an electric motor in a manner similar to the rollers of conveyors 10 and 12. A switch operator S11 is placed adajacent to conveyor 18 and is adapted to be engaged by the bar material as it is received upon the supporting surfaces of rollers 101b. Switch operator S11 influences a control circuit for energizing the electric motor that drives conveyor 18. Another switch operator S12 is disposed beneath transfer arms 170 and is adapted to be engaged thereby when said arms occupy a position below rollers 101a. Operator S12 controls the circuit which energizes the motor drive for conveyor 12 and prevents other bar material from being processed unless the transfer mechanism 17 has been returned to its starting position.

Control circuits for operating the transfer mechanism 15, the rejected bars conveyor 16 and the transfer mechanism 17 are illustrated in FIGS. 22 and 25a.

Once the bar material has been placed upon conveyor 18 it is moved toward and in front of furnace 20. A switch operator S13 located near the end of conveyor 18 controls a circuit for operating the conveyor and also moving pusher bars 19 forwardly. Switch operator S13 is positioned for being engaged by the bar material as it is moved upon the conveyor.

The pusher bars 19 are more particularly shown in FIGS. 2, 3 and 10, and are comprised of elongated tubular members 190 supported and guided between six side roller members 191, two top roller members 192, and bottom roller member 193. Each member 190 is provided with an ear 194 that is pivotally connected to a drive chain 195 by a link 196. Chains 195 are mounted between sprockets 197 and 198, sprocket 197 of each chain being mounted to a common shaft 199, which is driven by a reversible motor 200 through a gear reducer 201 and a sprocket-chain connection 202.

Tubular members 190 are provided with inner water-distributing pipes 203 for introducing a water coolant. The water introduced at inlet 204 is expelled through ports 205 from pipe 203, said water then flowing backward the length of tubular member 190 and passing out outlet 206. A drain port 206a is provided on the underside of the members 190. The flexible hose connections for introducing a coolant into inlet 204 and taking the heated water from outlet 206 are not shown.

Switch operators S14 and S15 are placed longitudinally of a tubular member 190 and operate in a control circuit to limit the reaches of pusher bar travel. Operator S14 also governs operation of conveyor 18. An ear 207 is mounted upon one of the tubular members for engaging the switch operators S14 and S15 as it is reciprocated within its roller guide supports.

Figure 11:
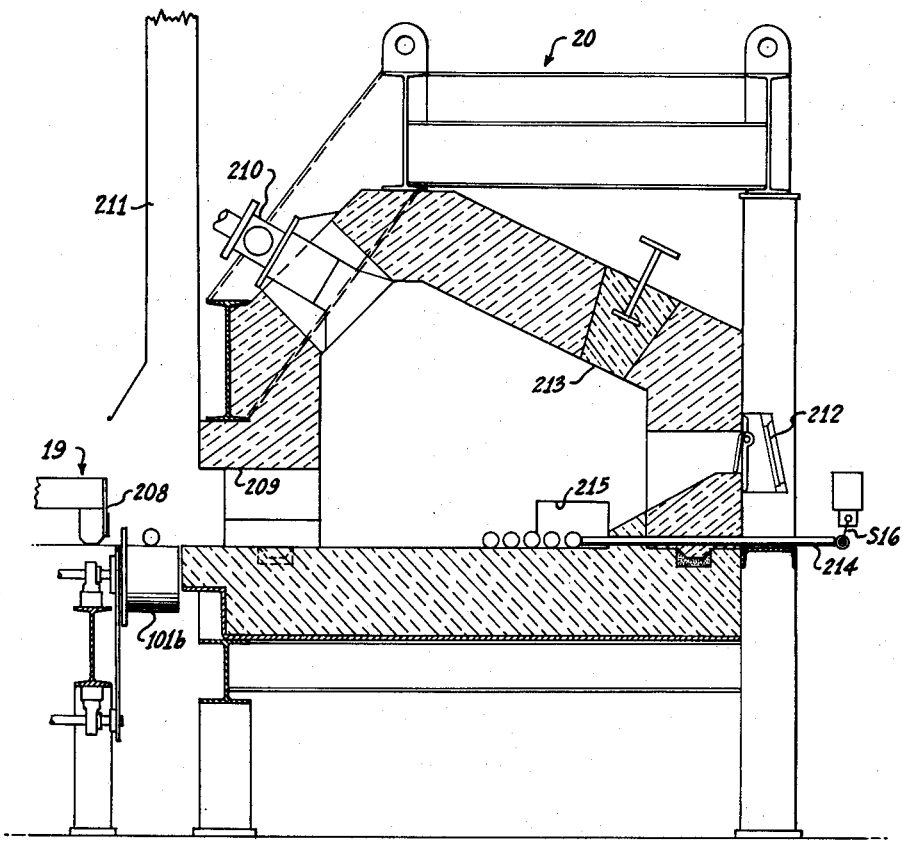
FIG. 11 is a vertical section taken on lines 11—11 of FIG. 1a, showing the furnace, including its sensing rod mechanism.

Nose plate 208 of each pusher bar 19 normally occupies a position between conveyors 10 and 18 as shown in FIGS. 2, 3 and 11. But when the tubes 190 are moved forward they engage the bar material then being supported upon conveyor 18 and move it into furnace 20 through an elongated slot 209.

Bar material is preferably held in the furnace long enough to heat it uniformly throughout to a specified temperature. In a preferred arrangement, furnace 20 has a capacity for receiving several bars at a time, and in one manner of operation said bars are inserted successively a given fixed distance each time. As each successive bar is inserted it engages the preceding bar and moves all of the bars until the first is in position for being ejected. As shown in FIG. 11, the furnace is provided with burner devices 210, a hooded duct 211, an observation window 212, an access opening fitted with a removable plug 213 and a sensing bar 214 for operating a switch operator S16. In case the bars become stuck together, plug 211 is removed and a tool is inserted through the access opening for separating them.

A single bar is removed from furnace 20 by ejector bar 21. The ejector bar mechanism, while shown only schematically may be constructed similarly to pusher bars 19 and driven reciprocally by its own reversible motor. A limit switch operator S17 is positioned in the path of ejector bar movement and is operated by a finger member 215 of the bar as said bar is retracted. When the ejector bar is moved forwardly in the furnace it engages the end of the most heated bar material, urging it out of the furnace exit and between ejector rolls 22. And as the bar material is passed out of the furnace by the ejector bar, switch operator S18 is engaged, thereby clutching the ejector rolls to a drive motor.

Ejector rolls 22 are mounted upon a frame 220 and comprise a grooved support roller 221 and a resiliently mounted upper roller 222. Roller 221 is affixed to a driven shaft 223 rotatably mounted in spaced bearings 224 and 225. Shaft 223 may be selectively driven by an electric motor 226 through a pulley drive 227 and a clutch device 228. Roller 222 is rotatably mounted upon shaft 229 supported in bearing blocks 230 and 231 which are reciprocally confined between vertical guides 232. Blocks 230 and 231 are biased downwardly by coiled springs 233 which are aligned by coaxial rod members 234. A switch operator S19 is mounted in the path of the bar material passing between rollers 221 and 222. This switch operator controls a circuit for returning the ejector pusher bar to its starting position.

The bar material has now been processed and conditioned for being butt-welded and continues in its movement toward the next roll stand.

*In-Process Butt-Weld Mechanism*

Figure 14:
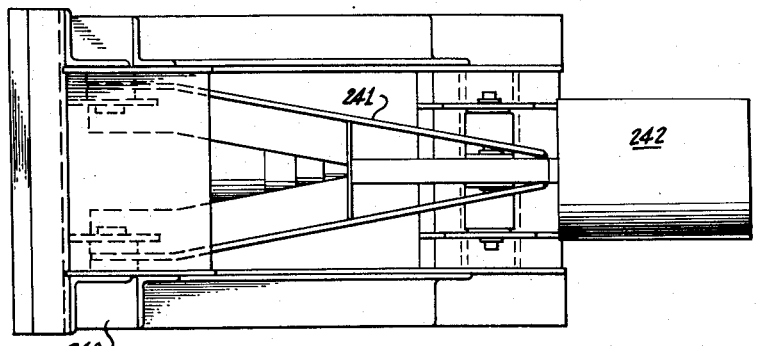
FIG. 14 is an enlarged plan view of a support roll shown in FIGS. 1a and 1b.
Figure 15:
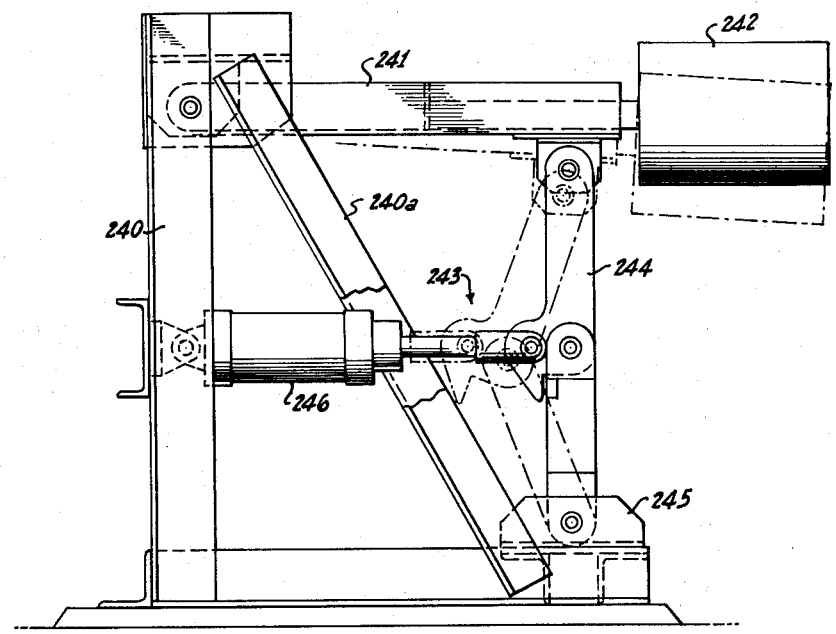
FIG. 15 is an elevation of a support roll.

As the bar material passes between ejector rolls 22 it is received upon support rolls 23, more particularly shown in FIGS. 14 and 15. Each support roll comprises a support frame having a vertical support member 240 and a brace 240a, a pivoted roller support 241, a roller member 242 and an actuating means 243 for moving the roller support with its roller into either a bar supporting position (shown in FIG. 15 as the solid line) or into an unsupporting position therebelow. Actuating means 243 includes a toggle joint connection 244 that interconnects the base 245 with the roller support 241, and a double acting pneumatic cylinder 246 interconnects the knee of toggle 244 with vertical member 240 from which it is pivotally supported. Each of the support rollers is normally held in its upper bar supporting position, but is actuated into its lower position by cylinder 246 to permit butt-welding apparatus 24 to pass thereover with clearance. Certain ones of the support rolls are power-driven for advancing the bar material toward roll stand No. 5. A conventional motor drive connection is provided for this purpose.

The butt-welding apparatus 24, details of which are shown in FIGS. 16, 17 and 18, is comprised generally of a welder track 247 and a welder car or carriage 248. A spur tooth rack 249 is mounted upon support frame 250, said frame also supporting rails 251 of track 247. Welder carriage 248 is provided with supporting roller members 252 that ride upon rails 251 and lateral guide rollers 253 which engage the side of said rails. The carriage is reciprocally moved over rails 251 by a reversible electric motor 254 that drives a spur gear 255 having its toothed surface engaged with rack 249.

A plurality of switch operators S20 is mounted upon frame 250 in the proximity of each support roll 23, and a finger member or cam 256 is mounted upon carriage 248. As the carriage is moved along track 247 by reversible motor 254 the finger member 256 engages respective switch operators S20. Each switch operator actuates a switch device that is connected in a control circuit including solenoid devices for operating cylinders 246, thereby causing respective support rollers 242 to be lowered as the weld car approaches, said rollers staying down until the car passes. A control circuit for operating each cylinder 246 is shown in FIGS. 22 and 25a, and has been described below in connection with the in-process butt-welding cycle.

The welding apparatus mounted upon carriage 248 includes an hydraulic power unit 257, a transformer 258, and bar clamping means generally designated by reference 259. Clamping means 259 comprises a forward bar clamping device 260 and a rear bar clamping device 261, said clamping devices being similarly constructed, each having a pair of arm members 262 and 263 pivotally mounted upon horizontally spaced pins 264 and 265, respectively. Pins 264 and 265 are supported between main support arms 266 and auxiliary support plates 267 with arm members 262 and 263 pivotally supported therebetween. Support arms 266 and 267 of each clamping device are rigidly mounted to and extend laterally outward from a vertical mounting plate 268. Each mounting plate is of a laminar construction having an intermediate layer of insulating material for electrically insulating each clamping device from the carriage.

Plates 268 are also provided with parallel dovetailed base edges 269 which mate with dovetailed grooves 270 upon the carriage. The mounting plate for the rear bar clamping device is freely movable within the grooves 270, but the forward mounting plate is rigidly secured to the carriage by any suitable means such as a bolt. With this construction the rear clamping device 260 may be reciprocally moved toward or away from the forward clamping device 260. And if a removable fastening means, such as the suggested bolt, is employed to secure the mounting plate of clamping device 260, then the position of said plate relative to the carriage may be adjusted.

The clamping arms 262 and 263 are interconnected by hydraulically operated cylinders 271a and 271b which when operated cause the clamping arms to be pivoted. A linkage means 272 also interconnects each pair of clamping arms with an ear extension 273 projecting from main support arm 266. Because of this linkage each clamping arm will be pivoted an equal amount upon operation of the actuating cylinder.

The rear clamping device 261 is reciprocally moved toward and away from clamping device 260 by hydraulically operated cylinder 274. A crank arm 275 is pendantly mounted from the carriage upon a pivot pin 275a, and the lower end of the crank arm is connected to the operated piston rod of cylinder 274. A pin member 276 affixed to slidable mounting plate 268 of clamping device 261 is loosely received by a bushing member 277 that is mounted intermediate the ends of crank arm 275. When cylinder 274 is actuated, the crank arm is pivotally swung between the full line and broken line positions illustrated in FIG. 17. Since the pin 276 is confined within bushing 277 it will be moved therewith, in turn imparting a reciprocatory type movement to the clamping device 261.

The jaw members 278 and 279 of each clamping device are made of heat resistant material and are fitted upon arms 262 and 263, respectively, with a tapered dovetail lock. The jaw receiving portions 280 and 281 are provided with pipes 282 through which a water coolant is passed in a conventional manner, although the apparatus for supplying such a coolant has not been shown.

Flexible bus bars 283 and 284 extend downwardly from transformer 258, and at a junction each divides into a pair of cable leads 285 and 286, said leads being connected to jaw receiving portions 280 and 281, respectively. It will be recalled that the jaw members of each clamping device are electrically insulated from the other by virtue of the laminar insulating construction of the vertical mounting plates 268.

A plurality of switch operators are mounted upon the weld car and extend into the path of bar movement. Switch operators S21, S22 and S23 are shown schematically in FIGS. 1a and 1b and are used to control the operation of the welding cycle. The particular function of each of these switch operators is explained hereinafter in connection with the control circuitry, shown in FIGS. 23 and 25b.

After a butt-weld has been formed between two successive bars there is usually considerable "flash" around the weld. This "flash," as it is known, is metal squeezed out by the forging pressure applied to the butt-welded joint. When the flash exceeds a predetermined amount it must be trimmed off; otherwise, it will show up in the finished rolled bar and an inferior product will result. Therefore, a flash stripper 25 may be installed in the production line to remove the excess flash.

While several types and designs of flash strippers may be utilized, the particular one shown in FIGS. 19 and 20 allows the bar material to be continuously moved. This flash stripper is comprised of four cutter members 290 which are quadrantly spaced from each other and are adapted to be moved inwardly by hydraulically operated cylinders 291. Each cutter member 290 is confined by a set of guide plates 292 that allow only a reciprocating movement thereof. A bar guide device 293 is also employed for centering the bar material with respect to the cutter members. The device is comprised of a pair of semi-conical plate members 294 that are adapted to be actuated by hydraulically operated cylinders 295 in a manner similar to the cutter members. The cutter members 290 and semi-conical plate members 294 are automatically operated by the control circuit (illustrated in FIGS. 24 and 25b) following each butt-weld operation.

Following the removal of the excess flash, the bar material is normally fed onto the next roll stand. However, in the event that something has happened to the bar in process to impair its quality, or if a defective bar has inadvertently been processed, it will be desirable to remove that defective section of the bar. A guillotine 26 is, therefore, installed in the production line. This guillotine or "flying-shear" cuts through the bar while it is in motion, allowing the defective bar section to be removed by a reject mechanism, not shown. It is also possible that the operation of the guillotine be used to stop that portion of the process between the holding furnace and roll stand No. 5.

*Control Operation and Circuitry for In-Process Butt-Welding*

FIG. 21 illustrates a hydraulic system for operating the clamping means 110 of cut-off machine 11 and the traversing mechanism of the end-forming machine 13. JIC symbols are used to designate the conventional control valve structures.

The clamping cylinders 110a and 110b are operated to their clamping positions by energizing solenoids SOL1 and SOL3, thereby connecting the pressure line from the fluid pressure source through control valves CV1 and CV2 to pressure line PL1. An additional clamping pressure is provided by a booster cylinder BC1 when the pressure in PL1, as indicated by pressure switch PS1, reaches a predetermined level. BC1 is controlled by valve CV3, and the booster pressure is applied by energizing SOL2 while deenergizing SOL3. At a second pressure level, indicated by pressure switch PS2, SOL1 and SOL2 are deenergized, thereby holding the cylinders under the applied pressure. To release the clamps, solenoids SOL3, SOL4 and SOL5 are energized, causing fluid to be directed from the pressure source into pressure line PL2 through CV2 and CV1, and the booster cylinder is reconditioned. When the pressure in line PL2 reaches a predetermined level, indicated by PS3, solenoids SOL3, SOL4 and SOL5 are deenergized, setting up the hydraulic circuit for another cycle.

The end-forming machine begins its traverse upon energizing SOL8, which actuates a control valve CV4, allowing fluid pressure to be applied to pressure line PL3. The speed of traversing is reduced when SOL9 actuates valve CV5 closed, thereby channeling the dump-connected pressure line PL4 through a restrictor device R1. The machine is returned to its starting position by deenergizing SOL8 and energizing SOL10. When the machine has completed its return SOL9 and SOL10 are deenergized, thereby conditioning the circuit for another cycle of operation.

A pneumatic operating means is utilized for actuating reject bar transfer mechanism 15, reject bar conveyor 16, transfer mechanism 17 and support rolls 23. The pneumatic circuitry is schematically illustrated in FIG. 22, said above named devices being operated by conventional control valves, indicated by JIC symbols.

Reject bar transfer mechanism 15 is controlled by valve CV5 and its operating solenoids SOL11 and SOL12. Upon energizing SOL11, air pressure is connected to pressure line PL5, moving the transfer arms upward. The arms are moved slowly downward by deenergizing SOL11 and energizing SOL12, air pressure then being applied through a restricter device R2 into PL6. After the transfer arms have returned to their original positions, SOL12 is deenergized.

A control valve CV6 is utilized for moving the rejected bars conveyor 16 in a reciprocating manner. Valve CV6, operated by solenoids SOL13 and SOL14, is actuated in a manner identical to CV5. Restricter devices R3 and R4 are placed in pressure lines PL7 and PL8, respectively, to slowly move the bar mechanism in both directions.

The transfer mechanism 17 is operated by valve CV7. Upon energizing SOL15 the air supply is directed into pressure line PL9 and through restricter device R5. When SOL15 is deenergized the air supply is directed into PL10, returning the transfer arms to a held-down position.

Support rolls 23 are normally held in their raised positions by air pressure from the air supply being transmitted through valve CV8 into PL11. When SOL17 is energized the air pressure is directed into line PL12 and through restricter R6, thereby depressing the support roll. The air supply is redirected to line PL11 whenever SOL17 is deenergized.

FIG. 23 illustrates a hydraulic operating means for actuating the sliding and fixed jaws of the welder apparatus, including hydraulic circuitry for completing a welding cycle. All valve structures are of conventional design and are indicated by JIC symbols.

The fixed jar is initially operated to a clamped position by energizing SOL20 of valve CV9 and SOL18 of valve CV10, which then transmits fluid pressure into line PL13. When a certain pressure has been applied, as indicated by PS4, SOL20 is deenergized and SOL21 of valve CV11 is actuated, thereby adding a booster pressure by operation of booster cylinder BC2. With the fixed jaw then clamped under a booster pressure as indicated by PS5, SOL18 and SOL21 are deenergized, holding the booster pressure in PL13. Subsequently, the sliding jaw is clamped by energizing solenoids SOL19 and SOL20, thereby actuating valves CV12 and CV9 and allowing fluid pressure to be applied to line PL14. A booster pressure is applied when PS6 indicates the first pressure level has been reached, SOL20 being deenergized while SOL21 is activated. Pressure switch PS7 will indicate that the booster pressure has been applied, and at this time SOL19 and SOL21 are deenergized, holding line PL14 under the booster pressure.

A weld cycle is then begun, valves CV13, CV14 and CV15 being actuated by their respective solenoids SOL22, SOL24 and SOL23. Fluid pressure is applied to the actuating cylinder 274 through pressure line PL15 and a servo control valve SCV, which valve is controlled by a rate cam RC that is in turn actuated by control cylinder CC, said control cylinder being actuated through a pressure line PL16. As the rate cam is being moved, it operates welder switches WS1, WS2 and WS3, said switches operating an electric control circuit for applying a welder current to the jaws. These switches also operate a control circuit for completing the welder cycle and unclamping both the fixed and the sliding jaw members. The control circuits for performing these latter operations are to be described in connection with FIG. 25b. A forging pressure is added to PL15 by deenergizing SOL22 and energizing SOL25 of valve CV16, which controls booster cylinder BC3.

After the weld has been made, the welder jaws are released by energizing solenoids SOL20, SOL29, SOL30 and SOL31, applying pressure to lines PL17 and PL18. This also returns the booster cylinder BC2 to its initial position. Actuating cylinder 274 is reversely operated through servo valve SCV and line PL19 by energizing SOL27 and SOL22 while deenergizing SOL23. At the same time, control cylinder CC is returned to its starting position by deenergizing SOL24 and energizing SOL28, allowing a pressure to be applied in line PL20. Booster cylinder BC3 is reversely operated by energizing SOL26 and deenergizing SOL21. After all operated cylinders have been returned to their respective starting positions the apparatus is reconditioned for another cycle of operation by deenergizing SOL20, SOL29, SOL30, SOL31, SOL22, SOL27, SOL28 and SOL26. The proper time for operating these last mentioned solenoids would be indicated by pressure switches PS8 and PS9, which indicate that the welder clamping jaws have been fully released.

It will be noted that if desirable, either the fixed or the sliding jaw may be opened by manually actuating respective solenoids SOL32 and SOL33.

Referring to FIGS. 1a, 1b and the operating circuitry illustrated in FIGS. 21, 22, 23, 24, 25a and 25b, a complete processing cycle is as follows:

As the first rough bar comes out of roll stand No. 4 it is received upon roller conveyor 10, which is initially started by pressing the starter button that energizes a motor starter MS2. The rough bar will then be moved forwardly toward the cut-off station, and the front of the bar will first engage the switch operator S1, opening the normally closed contacts S1a. The bar continues forward until it engages switch operator S2, thereby causing relay CR1 to be activated through normally closed contacts CR4a and CR5a. Relay CR1 operates contacts CR1a and CR1b which are, respectively normally open and normally closed. The reverse operation of contacts CR1a and CR1b energizes SOL1 and SOL3, while deenergizing MS2, thereby operating the cut-off machine clamps and stopping roller conveyor 10.

When a pressure of 400 p.s.i. is applied to clamps 110 the pressure switch PS1 will actaute contacts PS1a and PS1b, deenergizing SOL3 and energizing SOL2. A booster pressure of 1600 p.s.i. is then applied to the cut-off clamps, at which time pressure switch PS2 actuates, deenergizing SOL1 and SOL2, thereby locking the clamps at 1600 p.s.i. and energizing relay CR6.

Relay CR6 indicates that the bar has been clamped, and by closing contacts CR6a solenoid SOL6 is energized, starting the inward traverse of the reversible motor for the cut-off machine. The saw will advance, cropping the leading end of the bar, until switch operator S3 is engaged, which closes contacts S3a. As contacts S3a close, relay CR7 is energized, breaking contacts CR7a and closing contacts CR7b. This reverses the cut-off machine motor by deenergizing SOL6 and energizing SOL7. When the cut-off machine has been retracted switch operator S4 is engaged, causing contacts S4a to open and S4b to close. SOL7 is thereby deenergized, stopping the cut-off motor, and relay CR8 is activated, closing contact CR8b.

Providing all transfer arms 150 and 170 are beneath the roller members 101a, then switch operators S9 and S12 will be engaged, operating the normally open contacts S9a and S12a closed. The closing of contacts CR8b will, therefore, operate relay CR4, which opens contacts CR4a and deenergizes CR1, a holding circuit for CR4 being formed across contacts CR4b. This action releases the cut-off clamps by energizing solenoids SOL3, SOL4 and SOL5 through contacts CR1b and PS3a. The closure of contacts CR1b also starts the motors for conveyors 10 and 12 by energizing MS2 and MS3 through contacts CR4e and CR4f, and supported by holding circuits through contacts MS2a and MS3a.

When the pressure switch PS3 is operated, contacts PS3a are opened, deenergizing SOL3, SOL4 and SOL5. Since the line pressures to PS1 and PS2 have now been relieved they will have returned their respective operated contacts to their initial position, conditioned for another clamping operation.

If a second cropping of the leading end is desirable, a control button CB may be actuated. This will energize relay CR2 and its contacts CR2a and CR2b will close, thereby energizing relay CR1. In the manner previously described, the energization of relay CR1 will again stop conveyors 10 and 12 while initiating a second cutting operation. Relay CR2 is deenergized by CR8, which opens contacts CR8a when the cut-off machine completes its cycle of operation.

As the first rough bar is being moved toward an end-forming station upon conveyors 10 and 12, the cropped portion of the leading end is pushed forward until it falls onto the cropped ends conveyor 14. This conveyor, which is then (or previously energized by operating the start button and a hold circuit through contacts MS1a), carries the cropped portion to a remote cropped ends station. The conveyor is allowed to continuously operate while the production line is in operation and, therefore, as each advancing rough bar pushes a cropped end onto the cropped ends conveyor, said cropped ends are transported to the cropped end station. A stop button is operated whenever the production line is shut down.

With the leading end of the first rough bar being advanced toward the end-forming station, the trailing end passes over switch S1, closing contacts S1a and energizing relay CR3. Relay CR3 in turn operates contacts CR3a to open, thereby deenergizing relay CR4, closing contacts CR4a and energizing relay CR1. In the manner indicated above, CR1 closes contacts CR1a and opens contacts CR1b; the cut-off clamps are then applied by the action of SOL1 and SOL3, PS1 and its contacts PS1a and PS1b, and PS2 and its contacts PS2a and PS2b; and the motor drive for conveyors 10 and 12 is interrupted by the deenergization of MS2 and MS3.

Upon closure of contacts PS2a the relay CR6 is energized, closing contacts CR6a and starting the cut-off machine for cropping the trailing end of the bar. As above, SOL6 starts the cutter toward the bar and upon contacting switch operator S3 the cutter movement is reversed by operation of relay CR7 and SOL7, SOL6 being deenergized. When the cutter carriage returns to its original starting position switch operator S4 is engaged, deenergizing SOL7 and energizing relay CR8, said relay closing contacts CR8c.

Simultaneous with the closing of contacts CR6a and starting of the cut-off machine, relay CR6 also closes contacts CR6b. This initiates a control circuit for operating the end-forming machine 13. Since contacts CR3c were closed upon operation of relay CR3, SOL8 will be energized to bring the end-forming machine toward the cropped leading end of the rough bar, which soon engages the sensing bar 131 and moves it against the biasing spring 137 until it strikes switch operator S5. Contacts S5e are thereby closed, energizing SOL9 and slowing down the advance movement of the end-forming machine to a proper cutter feed. After a predetermined length of cut has been made and the bar end formed, the sensing bar 131 will then engage switch operator S6. This will close contacts S6a, energize SOL10 and CR9, thereby opening contacts CR9a and causing the end-forming machine to be returned to its starting position. As the cutter carriage of the machine arrives at its starting position, limit switch operator S7 closes contacts S7a and S7b, thereby setting up an operating circuit for relay CR5 while deenergizing SOL10 and stopping the end-forming carriage.

When both the cut-off machine and the end-forming machine have completed the above described cycles of operation, then relay CR5 is energized through contacts CR8c and S7a, a holding circuit being set up through contacts CR5b. Relay CR1 is again deenergized by the opening of contacts CR5a; contacts CR1a open in the manner above described releasing the cut-off machine clamps 110; and contacts CR1b close, energizing MS2 and MS3 and starting the motors for conveyors 10 and 12. As the trailing end of the first rough bar passes beyond S2, relay CR3 is deenergized and contacts CR3b open, setting up the cut-off and end-forming circuitry for another complete cycle of operation when the next rough bar material is received from roll stand No. 4.

The first bar is now totally supported upon conveyor 12 and is moving away from the cutting station and toward control switch operator S8. At this point, and while in transit, the bar is inspected. If the bar is thought to be unsuitable for butt-welding, or for any other reason, it may be removed from the processing line by actuating the reject-bar transfer button RBT. This energizes a circuit for SOL11 across contacts RBTa causing transfer arms 150 to be lifted, depositing the bar onto rejected bars conveyor 16 and allowing S9 to close contacts S9b. When button RBT is released a circuit is completed across contacts RBTb for actuating SOL12, returning transfer arms 150 to their position below the supporting surfaces of conveyor 12 where the contacts S9b are broken by operation of S9.

It will be noted that as long as transfer arms 150 are above the roller members of conveyor 12 (and the switch operator S9 is released) contacts S9a will be open, thereby inhibiting operation of relay CR4, and its contacts CR4a, which control the advance of a second bar onto conveyor 12 where the leading end is formed and the trailing end is cropped.

The rejected bars conveyor 16 is operated by push button RBC which controls a circuit through contacts RBCa and RBCb for solenoids SOL13 and SOL14, respectively. A repeated operation and release of button RBC will cause cylinder 165 to move arms 161 backward and forward as previously described.

Assuming the first bar material to be suitable for butt-welding and having passed inspection, the bar is allowed to advance and make contact with switch operator S8. This action causes an immediate interruption in the drive circuit for the motor of conveyor 12, breaking contacts S8a and deenergizing MS3. Contacts SB8 are also closed at this time, energizing SOL15, relay CR10 and closing its hold contacts CR10a. SOL15 actuates the transfer arms 170 into a raised position, causing the bar material to be transferred onto roller conveyor 18, said bar material then engaging switch operator S11 and opening contacts S11a. The transfer arms 170 are thereby returned to their original positions beneath the rollers of conveyor 12.

Switch operator S12, disposed beneath the rollers of conveyor 12, are adapted to be engaged by a transfer arm 170 when returned to its original position. As long as the transfer arms 170 are above the roller members of conveyor 12 contacts S12a will be open, and similar to contacts S9a this inhibits operation of relay CR4 and its contacts CR4a. Accordingly, unless both sets of transfer arms (150 and 170) have been returned to their positions beneath conveyor 12, no subsequent bar can be advanced onto that conveyor. Thus, the operations for the transfer mechanisms 15 and 17 are interlocked with the control circuit for cropping and forming a single bar member.

As soon as a bar member is placed onto conveyor 18, switch operator S11 detects this condition and operates contacts S11b, closing a circuit for the conveyor's motor and operating the motor starter MS4, which forms a holding circuit over contacts MS4a. The bar will be advanced toward switch operator S13 and in front of the holding furnace 20. Since this has been explained as the first bar to be processed, the pusher bars 19 will have been retracted to their starting position and contacts S14a will then be closed. However, if a second bar were to be moved forward into a position in front of the furnace, and if the pusher bars had not been returned from inserting the previous bar material, then conveyor 18 would not be operated until switch operator S14 was contacted and contacts S14a closed.

It will be noted that conveyors 10, 12 and 18 may each be independently operated by start and stop buttons, but only if there is no other processing step being carried on which would interfere or be obstructed by their respective operations.

Conveyor 18 carries the bar forward until its leading end contacts S13, thus breaking contacts S13a and deenergizing the conveyor's control circuit. Contacts S13b are simultaneously closed by S13, causing motor starter MS5 to be energized through a series of normally closed contacts. MS5 initiates operation of motor 200 and closes a holding circuit across contacts MS5a, said motor driving the pusher bars forward into engagement with the bar material and carrying it into furnace 20.

The pusher bars may be operated in one of two ways, depending upon the selected position of a selector switch SW. In the switch position illustrated in FIG. 21a, with contacts SW open and contacts SWb closed, the pusher bars will move the bar material until switch operator S15 is actuated at the threshold of holding furnace 20. When contact is made with S15, contacts S15a are broken, stopping forward movement of the pusher bars by deenergizing MS5. Contacts S15b are simultaneously closed, energizing a circuit for motor starter MS6, which operates contacts MS6a and holding contacts MS6b. The pusher bar motor 200 is now reversely operated and the bars are returned to their starting position. When the next bar is advanced along the holding furnace conveyor it too will strike switch S13 stopping conveyor 18 and advancing the pusher bars until switch S15 is again tripped, the pusher bars then being returned to their starting position. This procedure will repeat until the holding furnace is full of bars, at which time switch S16 will be actuated by the first inserted bar, said switch then operating contacts S16a and S16b, causing the pusher bars to be returned.

If the selector switch is placed in its other position, thereby closing contacts SWa and opening contacts SWb, any bar striking switch S13 will cause the pusher bars to advance fully until the engaged bar, or the first bar of the pack, strikes switch S16, reversing the pusher bars by operation of contacts S16a and S16b. It will be noted that selector switch SW has the effect of shunting the contacts S15a while opening the line otherwise operated by contacts S15b.

With the selector switch in either of the above positions, switch operator S16 operates contacts S16c, energizing a circuit for motor starter MS7, which operates the reversible drive motor for the ejector pusher bar in the forward direction. As the ejector pusher bar moves the first inserted bar out of the holding furnace, switch S18 is actuated, energizing a clutch solenoid SOL16 through contacts S18b and CR11a, causing the ejector pinch rolls 22 to be operatively driven. And after the bar is pushed into the ejector pinch rolls, switch operator S19 will open contacts S19a and close contacts S19b, thereby interrupting the forward drive circuit to MS7 and energizing a return drive circuit for the ejector pusher bar through MS8. The motor starters MS7 and MS8 both operate their own holding circuit contacts MS7a and MS8a, respectively, as well as the interrupting contacts MS8b and MS7b, which are serially connected in the others energizing circuit. The motor drive for the pinch rolls is initially started by a start button which energizes MS9 and its hold contacts MS9a.

Ejector pusher bar 21 is reversely operated through MS8 until it is returned to its original position at which time switch operator S17 is actuated, opening normally closed contacts S17b and deenergizing MS8. Operator S17 also closes contacts S17a that control the circuit for energizing the forward motor starter MS5 for the pusher bars. Until contacts S17a have been closed, indicating that the pusher bar 21 has been returned to its starting position, the pusher bars cannot again be operated.

Normally closed contacts S18a, operated by S18 as the ejector bar 21 pushes a bar from the furnace, also control the operation of motor starter MS5. Accordingly, until the bar then being ejected has been fully removed from the furnace and operator S18 released, a second cycle of pusher bar operation cannot occur.

The pinch rolls 22 move the bar material onto support rolls 23, some of which are power-driven by a motor that is energized by a motor starter MS10 having start and stop buttons and holding contacts MS10a. In addition, each of the ten support rolls shown is operated by a control circuit having pairs of switch-operated contacts and associated solenoids, only switch contacts S20a and S20j with their respective solenoids SOL17a and SOL17 being shown in the schematic of FIG. 21a. As previously explained, a plurality of switch operators S20 is disposed along the welder track; and as the welder car approaches each support roll, it engages an associated switch operator S20, causing its particular set of contacts, such as S20a, to be closed and energizing the related solenoid SOL17a, which actuates the support roll to a non-supporting position out of the path of the welder clamping jaws.

The pinch rolls 22 move the first bar extracted from the furnace toward the welder car, whereupon the leading end of the bar engages and passes through switch operators S21, S22 and S23, said latter operation closing contacts S23a and opening contacts S23b. When the trailing end of the bar passes beyond S21, contacts S21a close and since contacts S23a are also closed, relay CR12 is energized, closing contacts CR12a, operating a weld car speed control circuit SCC and establishing a hold circuit.

Speed control circuit SCC operates a motor for driving the weld car at a speed synchronous with roll stand No. 5. In a conventional circuit an auxiliary series motor may be used to start the weld car forward and then accelerate the car to a speed synchronous with the roll stand. At this speed a synchronous motor is automatically locked-in, and the series motor is disconnected. A reverse drive may later be applied by using the same series motor with a reversing drum connection. Such a control circuit is generally designated by the speed control circuit SCC which has three connecting leads. Line L1 initially energizes the series motor, starting the weld car forward; L2 operates a motor control that causes the series motor to accelerate the weld car to a speed synchronous with roll stand No. 5 and to then lock in a synchronous motor drive; line L3 is a control connection that connects the series motor for driving the weld car in the opposite or reverse direction.

As the trailing end of the first bar passes over S23 contacts S23b close, energizing a circuit across closed contacts CR12b, causing the weld car to accelerate and to lock into synchronism with roll stand No. 5. Relay CR13 is also actuated, thereby closing hold contacts CR13a, opening contacts CR13b, and actuating solenoids SOL18, SOL20, and control relay CR14. This causes the fixed welder jaws to be clamped and contacts CR14a to be closed. When a clamping pressure of 400 p.s.i. is reached PS4 is actuated, closing contacts PS4a and opening contacts PS4b, thereby deenergizing SOL20 but energizing SOL21, which applies a booster pressure of 4,000 p.s.i. At this clamping pressure, pressure switch PS5 is actuated, deenergizing SOL18 and relay CR14 by opening contacts PS5a. Since contacts CR14a are then opened, SOL21 also is deenergized, locking the jaws at 4,000 p.s.i. It will also be noted that when PS5 is actuated, contacts PS5b close, setting up a circuit for initiating a welder cycle.

The leading end of the next bar passes through switch operator S21. Upon striking S22, contacts S22a close, energizing SOL19 and CR15 through contacts CR13a, S22a and PS7a. Relay CR15 closes contacts CR15a, energizing SOL20 and clamping the sliding jaws upon the leading end of the second bar. Simultaneously, contacts CR15c close, energizing relay CR11, opening contacts CR11a while forming a hold circuit through contacts CR11b. This deenergizes SOL16, stopping the ejector pinch rolls. After a pressure of 400 p.s.i. has been applied, pressure switch PS6 is actuated, operating contacts PS6a open and deenergizing SOL20, but closing contacts PS6b and energizing SOL21 through contacts CR15b, which were closed by relay CR15. A booster pressure of 4,000 p.s.i. is now applied, causing pressure switch PS7 to be actuated, opening contacts PS7a and deenergizing SOL19 and relay CR15. Contacts CR15b then open, deenergizing SOL21 and locking the jaws. Actuation of PS7 also closes contacts PS7b, and since contacts PS5b are already closed, a welder cycle control circuit is begun.

When contacts PS5b and PS7b are both closed, solenoids SOL22, SOL23 and SOL24 are energized, applying 400 p.s.i. to the servo valve and the servo valve control cam cylinder. The cam begins its uniform motion and the cam follower operates the servo valve, providing a rate control for the sliding jaw cylinder. As the cam begins its motion, switch operator WS1 is allowed to close contacts WS1a, energizing a weld current relay CR18 which applies a welding current from the transfer through the clamping jaws to the work. When the cam nears the end of its travel, operator WS2 is actuated, closing contacts WS2a and energizing a time delay TD1, which after a pre-set time turns off the weld current by opening contacts TD1a. Shortly after (or simultaneously with the closing of contacts WS2a), WS3 is actuated, closing contacts WS3a and energizing CR16, SOL25 and a time delay relay TD2. Relay CR16, by opening contacts CR16a and CR16b, deenergizes SOL22 and SOL24, applying a booster pressure of 4,000 p.s.i. to the sliding jaw cylinder and performing the forge. TD2, meanwhile, times the forge; and when the weld is complete, contacts TD2a are closed, energizing CR17 and closing its contacts CR17a and CR17b. Solenoids SOL26, SOL27 and SOL28 are also energized, while SOL23, SOL25 and CR16 are deenergized by the opening of contacts CR17c and CR17d. Now 400 p.s.i. is applied to both the sliding jaw cylinder and the servo valve control cylinder, returning their respective piston members to their starting positions. Contacts CR17e are opened by CR17 to prevent reactivation of relay CR18 when operator WS2 is released. Relay CR17 also opens contacts CR17f, interrupting the drive connection over line L2 and causing the weld car to be stopped.

Upon completion of the forge and the energizing of CR17, contacts CR17g are also closed. This action completes a circuit for SOL29, SOL30, SOL31 and relay CR19, said relay having hold contacts CR19a. With the releasing of the weld car jaw clamps, PS5 and PS7 operate contacts PS5b and PS7b to open, and when the clamps are fully opened and held under pressure of 400 p.s.i., pressure switches PS8 and PS9 will open contacts PS8a and PS9a, causing SOL29, SOL30, SOL31 and CR19 to be deenergized. Relay CR19 will then allow contacts CR19b to open and CR19c to close, causing SOL20 to be deenergized and resetting the weld car jaw clamping circuit. The return of the control cam to its original position will actuate WS1 to open, thereby completely resetting the welder cycle control.

Pressure switches PS8 and PS9 also operate contacts PS8b and PS9b, respectively. These contacts are closed after the complete release of the welder car jaws, and the weld car speed control circuit SCC is then put into a reverse drive connection through normally closed contacts S24a and contacts S21b, said latter contacts being operated by switch operator S21 which is held by the rearmost bar member of the butt-weld. The car will now travel to the starting position, whereupon switch operator S24 is engaged, interrupting the drive circuit through line L3 and stopping the weld car. If, however, the end of the rearmost bar arrives past switch operator S21 on the weld car before S24 is engaged, contacts S21b will open line L3. And in either event, whenever the trailing end passes switch S21, contacts S21a will close and the above clamping and welding procedures will be repeated.

A control circuit is provided for operating the flash stripper 25 after the weld cycle is completed. When relay CR19 is actuated during the release of the weld car jaws, contacts CR19d are closed, energizing SOL34 and a time delay TD3, immediately closing hold contacts TD3a. The bar centering guides are moved toward the bar material, followed in order by the front stripping cutters, then the rear stripping cutters. The cutters remain in this position until the time delay TD3 has timed out, by which time the weld has passed the stripper and been stripped of its flash. When TD3 times out, contacts TD3b and TD3c are actuated, deenergizing SOL34 and energizing SOL35. Meanwhile, relay CR19 is deenergized, opening contacts CR19d. The bar centering guide and both flash stripping cutters are then retracted until pressure switches PS10, PS11 and PS12 are each actuated and contacts PS10a, PS11a and PS12a are opened, resetting the time delay TD1 and deenergizing SOL35.

It will be noted that the entire control system is so interlocked that if one bar material is being processed through a particular stage of operation, a second bar material cannot be introduced to that stage of operation until the first bar material is completely processed. In this way the apparatus cannot be jammed by an inadvertency, such as commonly results where only a manual control is employed. Theoretically, however, as one bar is ejected from the holding furnace 20 another bar is waiting on the holding furnace conveyor 18 to be pushed into the furnace by the pusher bars. Accordingly, the apparatus described will operate continuously and the bar material which is fed through roll stand No. 5 will appear as a continuous rod.

The guillotine 26 is manually operated in a conventional manner and at the discretion of an observing inspector. But unless it becomes necessary to remove a section of the welded bar material, all material passing through roll stand No. 5 will be part of a continuous bar. Since the number of leading bar ends which must be inserted through the No. 5 roll stand is minimal, there are far fewer opportunities for a cobble to result.

In view of the above detailed description of this invention, it will be apparent that various changes and arrangements of parts may be resorted to without departing from the spirit of the invention. It is, therefore, to be understood that the form of the invention herewith shown and described is to be taken as a preferred example thereof, and that the various modifications or changes which are within the scope of the attached claims is contemplated.

Having thus described my invention, what I claim and desire to secure by Letters Patent is:

1. Apparatus for butt-welding the ends of two bars as they are being moved along a conveyor, comprising: a weld car track extending longitudinally of said conveyor, a weld car mounted for reciprocal movement along said track; butt-welding apparatus supported upon said weld car and movable therewith, said apparatus including a front and a rear clamping means for respectively gripping the tail end of a first bar and the lead end of a second bar from above said conveyor, said welding apparatus also including means for bringing the ends of said bars into abutment; means for moving said weld car along said track in the direction of bar movement with substantially the same speed as said conveyor moves said bars, a first control circuit with a first switch means disposed upon said weld car for operating said front clamping means and initiating weld car movement in the direction of bar movement, and a second control circuit with a second switch means disposed upon the weld car for operating said rear clamping means and initiating a welding cycle of operation.

2. The apparatus of claim 1 including a third control circuit for reversing the direction of weld car movement upon completion of said welding cycle.

3. The apparatus of claim 2 including a limit switch in said third control circuit for stopping said weld car at an up-track limiting station.

4. The apparatus of claim 2 including a third switch means disposed upon said weld car and connected in said first and third control circuits for operating said front clamping means and initiating weld car movement in the direction of bar movement for another cycle of operation.

5. The apparatus of claim 4 including a limit switch in said third control circuit for stopping said weld car at an up-track limiting station.

6. Apparatus for butt-welding the ends of two bars as they are being moved in-process, comprising: a roller type conveyor, said conveyor having longitudinally spaced roller stands with roller members for supporting said bars, each of said roller members being movable between an upper bar-supporting position and a lower unsupporting position; a weld car track extending longitudinally of said conveyor, a weld car mounted for reciprocal movement along said track; butt-welding apparatus supported upon said weld car and movable therewith, said apparatus including a front and a rear clamping means for respectively gripping the tail end of a first bar from above said conveyor, said welding apparatus also including means for bringing the ends of said bars into abutment; means for moving said weld car along said track, and means responsive to the approachment of said weld car for actuating said roller members into their respective unsupporting positions; whereby said conveyor supports said bars but allows free traversing movement of said weld car upon said track.

7. Apparatus for butt-welding the ends of two bars as they are being moved in-process, comprising: a roller type conveyor, said conveyor having longitudinally spaced roller stands with roller members for supporting said bars, each of said roller members being movable between an upper bar-supporting position and a lower unsupporting position, and having an operating means for moving said roller member between upper and lower positions; a weld car track extending longitudinally of said conveyor, a weld car mounted for reciprocal movement along said track; butt-welding apparatus supported upon said weld car and movable therewith, said apparatus including a front and a rear clamping means for respectively gripping the tail end of a first bar and the lead end of a second bar from above said conveyor, said welding apparatus also including means for bringing the ends of said bars into abutment; trip means disposed along said track and responsive to the approach of said weld car for actuating each roller operating means and placing the associated roller member in its lower unsupporting position, said operating means returning the associated roller members to their upper supporting positions after said weld car has passed; whereby said conveyor supports said bars but allows free traversing movement of said weld car upon said track.

8. Apparatus for butt-welding the ends of two bars as they are being moved in-process, comprising: a roller type conveyor, said conveyor having longitudinally spaced roller stands with roller members for supporting said bars, each of said roller members being movable between an upper bar-supporting position and a lower unsupporting position, and having an operating means for moving said roller member between upper and lower positions; a weld car track extending longitudinally of said conveyor, a weld car mounted for reciprocal movement along said track; butt-welding apparatus supported upon said weld car and movable therewith, said apparatus including a front and a rear clamping means for respectively gripping the tail end of a first bar and the lead end of a second bar from above said conveyor, said welding apparatus also including means for bringing the ends of said bars into abutment; trip means disposed along said track and responsive to the approach of said weld car for actuating each roller operating means and placing the associated roller member in its lower unsupporting position, said operating means returning the associated roller members to their upper supporting positions after said weld car has passed; whereby said conveyor supports said bars but allows free traversing movement of said weld car upon said track; a first control circuit with a first switch means disposed upon said weld car for operating said front clamping means and initiating weld car movement in the direction of bar movement, and a second control circuit with a second switch means disposed upon the weld car for operating said rear clamping means and initiating a welding cycle of operation.

9. The apparatus of claim 8 including a third control circuit for reversing the direction of weld car movement upon completion of said welding cycle.

10. The apparatus of claim 9 including a limit switch in said third control circuit for stopping said weld car at an up-track limiting station.

11. The apparatus of claim 9 including a third switch means disposed upon said weld car and connected in said first and third control circuits for operating said front clamping means and initiating weld car movement in the direction of bar movement for another cycle of operation.

12. The apparatus of claim 11 including a limit switch in said third control circuit for stopping said weld car at an up-track limiting station.

References Cited in the file of this patent

UNITED STATES PATENTS

| | | |
|---|---|---|
| 444,855 | Ries | Jan. 20, 1891 |
| 972,928 | Schneider | Oct. 18, 1910 |
| 1,736,428 | Bryant | Nov. 19, 1910 |
| 1,899,991 | Smith | Mar. 7, 1933 |
| 2,015,184 | Hopkins | Sept. 24, 1935 |
| 2,261,837 | Allen | Nov. 4, 1941 |
| 2,303,557 | Jones | Dec. 1, 1942 |
| 2,525,862 | Carpenter et al. | Oct. 17, 1950 |
| 2,623,973 | Malke | Dec. 30, 1952 |
| 2,627,009 | Corson et al. | June 27, 1953 |
| 2,729,879 | Sampson | Jan. 10, 1956 |
| 2,737,140 | Totten | Mar. 6, 1956 |
| 2,842,349 | Ipsen | July 8, 1958 |
| 2,848,206 | Kniveton | Aug. 19, 1958 |
| 2,911,516 | Cox | Nov. 3, 1959 |